US012633191B2

(12) United States Patent
Pariseau et al.

(10) Patent No.: US 12,633,191 B2
(45) Date of Patent: *May 19, 2026

(54) GAMING MACHINE AND CONTROL METHOD FOR OPERATING GAMING MACHINES TO DISPLAY COMPUTER-ANIMATED REEL GAMES

(71) Applicant: Konami Gaming, Inc.

(72) Inventors: John Pariseau, Las Vegas, NV (US); Yuji Ono, Las Vegas, NV (US)

(73) Assignee: Konami Gaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/214,382

(22) Filed: Jun. 26, 2023

(65) Prior Publication Data

US 2024/0119782 A1 Apr. 11, 2024

Related U.S. Application Data

(63) Continuation of application No. 16/152,793, filed on Oct. 5, 2018, now Pat. No. 11,734,992.

(51) Int. Cl.
*G07F 17/34* (2006.01)
*G07F 17/32* (2006.01)

(52) U.S. Cl.
CPC .......... *G07F 17/3213* (2013.01); *G07F 17/34* (2013.01)

(58) Field of Classification Search
CPC ............................. G07F 17/3213; G07F 17/34
USPC ............................................................ 463/20
See application file for complete search history.

(56) References Cited

U.S. PATENT DOCUMENTS

| | | | |
|---|---|---|---|
| 6,413,462 B1 | 7/2002 | Zoell et al. | |
| 11,734,992 B2 * | 8/2023 | Pariseau | G07F 17/34 463/20 |
| 2009/0124338 A1 | 5/2009 | Watkins et al. | |
| 2010/0029381 A1 * | 2/2010 | Vancura | G07F 17/3267 463/30 |
| 2014/0248937 A1 | 9/2014 | Singer et al. | |
| 2014/0256402 A1 | 9/2014 | Caputo et al. | |

(Continued)

FOREIGN PATENT DOCUMENTS

| | | |
|---|---|---|
| JP | 2009-201946 A | 9/2009 |
| JP | 2016-39888 A | 3/2016 |
| WO | 2016/024522 A1 | 2/2016 |

*Primary Examiner* — Ryan Hsu
(74) *Attorney, Agent, or Firm* — Howard & Howard Attorneys PLLC

(57) ABSTRACT

A gaming machine is described herein. The gaming machine includes a game control unit programmed to display computer-generated graphics including a plurality of virtual reels. The game control unit displays a game screen including a grid having a plurality of cells arranged in a plurality of rows and columns, and displays the plurality of virtual reels in the grid. Each of the plurality of virtual reels includes a plurality of credit prize symbols. The game control unit spins and stops each of the plurality of virtual reels to display an outcome of the game. The game control unit detects an appearance of a special symbol in the outcome of the game, responsively determines a credit prize amount based on the credit prize symbols appearing in the outcome of the game, and provides the determined credit prize amount to a player.

14 Claims, 31 Drawing Sheets

(56) References Cited

U.S. PATENT DOCUMENTS

| | | | |
|---|---|---|---|
| 2015/0356833 | A1 | 12/2015 | Aoki et al. |
| 2017/0039802 | A1 | 2/2017 | Prabhu et al. |

* cited by examiner

88

86

| 72 | 74 | 76 | 78 | 80 |
|---|---|---|---|---|
| PicB | 9 | PicB | PicD | Special |
| Q | Credit | Special | 9 | PicA |
| K | Wild | J | 10 | 10 |
| PicA | Q | Q | Special | A |
| 9 | Credit | PicD | PicD | PicA |
| J | J | Wild | Q | K |
| K | Special | J | A | 10 |
| Credit | PicB | Q | K | 9 |
| 9 | 10 | PicA | Credit | PicA |
| Special | PicA | Credit | Credit | Credit |
| J | Credit | K | PicB | Credit |
| PicC | Credit | PicA | 10 | PicC |
| Credit | Wild | A | PicC | PicB |
| Credit | A | Wild | PicD | 10 |
| PicA | PicB | PicB | Wild | PicD |
| A | PicC | 10 | PicB | A |
| Q | K | PicD | J | Credit |
| PicD | PicD | A | Q | K |
| Wild | A | Credit | PicC | Q |
| PicA | J | Credit | A | PicA |

64

FIG. 4

90

102 104 106 108 110

98 100 112 114 116 122 136

| Reel Strip Layout | | | | | |
|---|---|---|---|---|---|
| Stop Position | 1st reel | 2nd reel | 3rd reel | 4th reel | 5th reel |
| 0 | PIC-d | PIC-c | PIC-a | PIC-b | PIC-c |
| 1 | Q | K | J | PIC-b | PIC-a |
| 2 | 9 | Prize | A | Prize | Inner |
| 3 | Inner | 10 | A | A | PIC-a |
| 4 | Q | PIC-a | Prize | PIC-d | PIC-a |
| 5 | K | PIC-a | PIC-b | 10 | 10 |
| 6 | PIC-c | PIC-a | A | PIC-d | PIC-c |
| 7 | J | K | K | 9 | PIC-c |
| 8 | J | Q | 10 | Q | PIC-c |
| 9 | Inner | WILD | J | WILD | A |
| 10 | Q | WILD | PIC-d | WILD | PIC-b |
| 11 | PIC-a | A | PIC-d | PIC-b | J |
| 12 | A | K | PIC-d | 10 | Prize |
| 13 | A | A | A | PIC-c | K |
| | | | Inner | PIC-c | 9 |
| 37 | 10 | J | | | |
| 38 | PIC-c | J | 10 | PIC-c | K |
| 39 | J | PIC-b | 10 | Inner | PIC-b |
| 40 | Prize | PIC-b | Inner | PIC-b | Prize |
| 41 | PIC-b | K | 9 | PIC-b | PIC-b |
| 42 | K | K | 9 | 9 | 10 |
| 43 | J | Prize | 9 | A | A |
| 44 | PIC-a | 9 | Prize | A | PIC-d |
| 45 | A | 9 | J | 10 | A |
| 46 | K | 9 | J | Inner | Inner |
| 47 | A | Inner | PIC-b | PIC-a | Q |
| 48 | PIC-b | PIC-a | K | PIC-a | PIC-d |
| 49 | Q | PIC-a | PIC-a | PIC-a | PIC-a |
| 50 | PIC-d | 10 | Q | Q | Q |
| 51 | PIC-d | 10 | 9 | 9 | 9 |
| 52 | 10 | PIC-d | PIC-c | PIC-c | PIC-c |
| 53 | K | PIC-d | K | K | PIC-c |
| 54 | PIC-c | PIC-d | PIC-c | PIC-c | PIC-c |
| 55 | PIC-c | 10 | Q | Q | Q |
| 56 | 9 | J | K | K | K |
| 57 | 9 | J | K | K | K |

FIG. 15

124

| Inner Reel Strip Layout (128) | |
|---|---|
| Stop Position | Inner |
| 0 | Special |
| 1 | Special |
| 2 | Special |
| 3 | Special |
| 4 | Special |
| 5 | Special |
| 6 | Special |
| 7 | Special |
| 8 | Special |
| 9 | Special |
| 10 | Special |
| 11 | PIC-a |
| 12 | PIC-b |
| 13 | PIC-c |
| 14 | PIC-d |
| 15 | A |
| 16 | K |
| 17 | Q |
| 18 | J |
| 19 | 10 |
| 20 | 9 |

114, 100, 112, 120

FIG. 16

126

| Inner Reel Weights | | |
|---|---|---|
| | (132) | Given Special (134) |
| Special | 52% | |
| PIC-a | 5% | 10% |
| PIC-b | 5% | 10% |
| PIC-c | 5% | 10% |
| PIC-d | 5% | 10% |
| A | 5% | 10% |
| K | 5% | 10% |
| Q | 5% | 10% |
| J | 5% | 10% |
| 10 | 5% | 10% |
| 9 | 5% | 10% |

130

FIG. 17

92
118
| GAME SYMBOL | IMAGE FILE | IMAGE |
|---|---|---|
| 86 Wild | [WILD] | 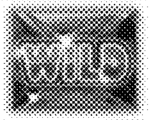 |
| PIC-a | [SEVEN] | 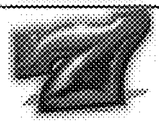 |
| 86 PIC-b | [CLOVER] | 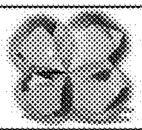 |
| PIC-c | [HORSESHOE] | 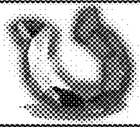 |
| PIC-d | [STAR] | 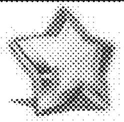 |
| A | [ACE] | 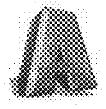 |
| K | [KING] | 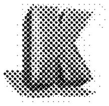 |
| Q | [QUEEN] | 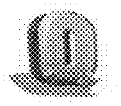 |
| J | [JACK] | 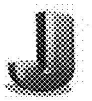 |
| 10 | [TEN] | 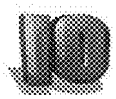 |
| 9 | [NINE] | 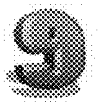 |
| 120 Special | [POW] | 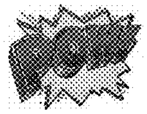 |
FIG. 18

94
144
| CREDIT PRIZE SYMBOL | IMAGE FILE | IMAGE |
| --- | --- | --- |
| 0active | [BLANK] | 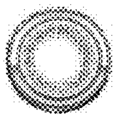 |
| 50active | [ACTIVE 50] | 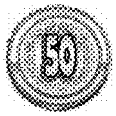 |
| 100active | [ACTIVE 100] | 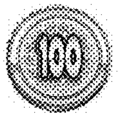 |
| 200active | [ACTIVE 200] | 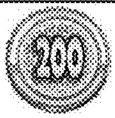 |
| 250active | [ACTIVE 250] |  |
| 400active | [ACTIVE 400] | 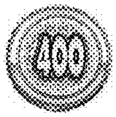 |
| 500active | [ACTIVE 500] | 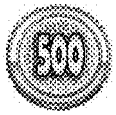 |
| 800active | [ACTIVE 800] | 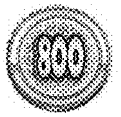 |
138
138
FIG. 19

96
| CREDIT PRIZE SYMBOL | IMAGE FILE | IMAGE |
|---|---|---|
| 0active | [BLANK] | 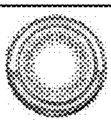 |
| 100inactive | [INACTIVE 100] | 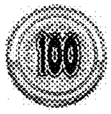 |
| 200inactive | [INACTIVE 200] | 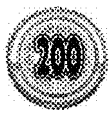 |
| 500inactive | [INACTIVE 500] | 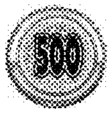 |
| 1000inactive | [INACTIVE 1000] | 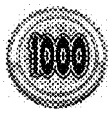 |
| 2000inactive | [INACTIVE 2000] | 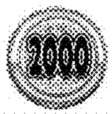 |
| 5000inactive | [INACTIVE 5000] | 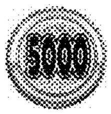 |
| 10000inactive | [INACTIVE 10000] | 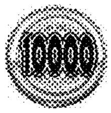 |
| 20000inactive | [INACTIVE 20000] | 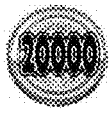 |
| 5000locked | [LOCKED 5000] | 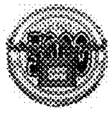 |
| 10000locked | [LOCKED 10000] | 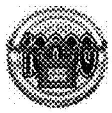 |
| 20000locked | [LOCKED 20000] | 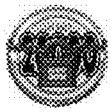 |
138
138
146
148
FIG. 20

140

144 146 150 148

| PRIZE SYMBOL WEIGHT TABLE MIN BET VALUE | |
|---|---|
| CREDIT PRIZE SYMBOL | SYMBOL WEIGHT |
| 100active | 20% |
| 200active | 20% |
| 500active | 1% |
| 100inactive | 1% |
| 200inactive | 1% |
| 500inactive | 2% |
| 5000locked | 10% |
| 10000locked | 20% |
| 20000locked | 25% |

FIG. 21

142

| PRIZE SYMBOL WEIGHT TABLE MAX BET VALUE | |
|---|---|
| CREDIT PRIZE SYMBOL | SYMBOL WEIGHT |
| 100active | 20% |
| 200active | 20% |
| 500active | 20% |
| 100inactive | 10% |
| 200inactive | 10% |
| 500inactive | 5% |
| 5000inactive | 5% |
| 10000inactive | 5% |
| 20000inactive | 5% |

144
146

FIG. 22

154

164 166

| Bonus Feature Reel Strip Layout | | |
|---|---|---|
| Stop Position | REEL A | REEL B |
| 0 | ACTIVE | ACTIVE |
| 1 | INACTIVE | INACTIVE |
| 2 | ACTIVE | INACTIVE |
| 3 | ACTIVE | SPECIAL |
| 4 | ACTIVE | INACTIVE |
| 5 | INACTIVE | INACTIVE |
| 6 | ACTIVE | INACTIVE |
| 7 | ACTIVE | INACTIVE |
| 8 | ACTIVE | |
| 9 | ACTIVE | |
| 10 | ACTIVE | |
| 11 | INACTIVE | |
| 12 | ACTIVE | |
| 13 | ACTIVE | |
| 14 | ACTIVE | |
| 15 | INACTIVE | |
| 16 | ACTIVE | |
| 17 | ACTIVE | |
| 18 | ACTIVE | |
| 19 | INACTIVE | |
| 20 | ACTIVE | |
| 21 | ACTIVE | |
| 22 | ACTIVE | |
| 23 | INACTIVE | |
| 24 | ACTIVE | |

114 98 100 172/120 112 168 170

FIG. 23

156

| REEL A WEIGHTS: MINIMUM BET VALUE | | | |
|---|---|---|---|
| Active Prizes | Credit Values | Active Weight | Relative Weight |
| 400active | 400 | 2 | 0% |
| 250active | 250 | 5 | 1% |
| 100active | 100 | 21 | 4% |
| 50active | 50 | 62 | 12% |
| 0active | 0 | 410 | 82% |
| | | | |
| Inactive Prizes | Credit Values | Inactive Weight | Relative Weight |
| 20000Locked | 0 | 20 | 1% |
| 10000Locked | 0 | 40 | 1% |
| 5000Locked | 0 | 40 | 1% |
| 1000inactive | 1000 | 40 | 1% |
| 500inactive | 500 | 200 | 5% |
| 100inactive | 100 | 1100 | 28% |
| 0inactive | 0 | 2560 | 64% |

FIG. 24

158

| REEL B WEIGHTS: MINIMUM BET VALUE | | | |
|---|---|---|---|
| Active Prizes | Credit Values | Active Weight | Relative Weight |
| 400active | 400 | 2 | 2% |
| 250active | 250 | 5 | 6% |
| 100active | 100 | 21 | 23% |
| 50active | 50 | 62 | 69% |
| 0active | 0 | 0 | 0% |
| | | | |
| Inactive Prizes | Values | Inactive Weight | Relative Weight |
| 20000Locked | 0 | 20 | 0.3% |
| 10000Locked | 0 | 80 | 1% |
| 5000Locked | 0 | 300 | 4% |
| 1000inactive | 1000 | 1000 | 13% |
| 500inactive | 500 | 2560 | 32% |
| 100inactive | 100 | 4000 | 50% |
| 0inactive | 0 | 0 | 0% |

FIG. 25

160

| REEL A WEIGHTS:<br>MAXIMUM BET VALUE | | | |
|---|---|---|---|
| Active Prizes | Credit Values | Active Weight | Relative Weight |
| 800active | 800 | 20 | 4% |
| 500active | 500 | 20 | 4% |
| 200active | 200 | 20 | 4% |
| 100active | 100 | 60 | 12% |
| 0active | 0 | 380 | 76% |
| | | | |
| Inactive Prizes | Credit Values | Inactive Weight | Relative Weight |
| 20000inactive | 0 | 20 | 1% |
| 10000inactive | 0 | 20 | 1% |
| 5000inactive | 0 | 20 | 1% |
| 2000inactive | 2000 | 80 | 2% |
| 1000inactive | 1000 | 300 | 8% |
| 200inactive | 200 | 1000 | 25% |
| 0inactive | 0 | 2560 | 64% |

FIG. 26

162

| REEL B WEIGHTS:<br>MAXIMUM BET VALUE | | | |
|---|---|---|---|
| Active Prizes | Credit Values | Active Weight | Relative Weight |
| 800active | 800 | 20 | 4% |
| 500active | 500 | 20 | 4% |
| 200active | 200 | 20 | 4% |
| 100active | 100 | 60 | 12% |
| 0active | 0 | 380 | 76% |
| | | | |
| Inactive Prizes | Values | Inactive Weight | Relative Weight |
| 20000inactive | 0 | 80 | 1% |
| 10000inactive | 0 | 80 | 1% |
| 5000inactive | 0 | 220 | 3% |
| 2000inactive | 2000 | 2000 | 25% |
| 1000inactive | 1000 | 2560 | 32% |
| 200inactive | 200 | 3000 | 38% |
| 0inactive | 0 | 0 | 0% |

FIG. 27

174

114

| Stop Position | Random Number Range |
|---|---|
| 1 | 1-50 |
| 2 | 51-100 |
| 3 | 101-150 |
| 4 | 151-200 |
| 5 | 201-250 |
| 6 | 251-300 |
| 7 | 301-350 |
| 8 | 351-400 |
| 9 | 401-450 |
| 10 | 451-500 |
| 11 | 501-550 |
| 12 | 551-600 |
| 13 | 601-650 |
| 14 | 651-700 |
| 15 | 701-750 |
| 16 | 751-800 |
| 17 | 801-850 |
| 18 | 851-900 |
| 19 | 901-950 |
| 20 | 951-1000 |

FIG. 28

178

| PAY TABLE<br>LEFT TO RIGHT ON ADJACENT POSITIONS | | | 1 BET LEVEL | | |
|---|---|---|---|---|---|
| SYMBOL NAME | 1 SYMBOL | 2 SYMBOLS | 3 SYMBOLS | 4 SYMBOLS | 5 SYMBOLS |
| WILD | | | | | |
| SEVEN | | | 50 | 200 | 400 |
| CLOVER | | | 25 | 50 | 100 |
| HORSESHOE | | | 25 | 50 | 100 |
| STAR | | | 25 | 50 | 100 |
| A | | | 10 | 20 | 30 |
| K | | | 10 | 20 | 30 |
| Q | | | 5 | 10 | 20 |
| J | | | 5 | 10 | 20 |
| 10 | | | 5 | 10 | 20 |
| 9 | | | 5 | 10 | 20 |

FIG. 30

GAMING MACHINE AND CONTROL METHOD FOR OPERATING GAMING MACHINES TO DISPLAY COMPUTER-ANIMATED REEL GAMES

CROSS-REFERENCE TO RELATED APPLICATION

This application is a continuation of U.S. patent application Ser. No. 16/152,793, filed Oct. 5, 2018, the disclosures of which are hereby incorporated by reference in their entirety for all purposes.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

SUMMARY OF INVENTION

In one aspect of the present invention, a gaming machine is provided. The gaming machine includes a display unit configured to display game screens including computer-generated images, a memory device storing a game execution program including computer instructions for generating a computer-generated graphics of a plurality of virtual reels, and a game control unit for executing a game including the plurality of virtual reels. The game control unit including a processor programmed to execute the game execution program to display a game screen on the display unit including a grid having a plurality of cells arranged in a plurality of rows and columns. The game control unit displays the plurality of virtual reels in the grid with each virtual reel being displayed in a corresponding column. Each of the plurality of virtual reels includes a plurality of credit prize symbols. The game control unit spins and stops each of the plurality of virtual reels to display an outcome of the game. The game control unit detects an appearance of a special symbol in the outcome of the game, responsively determines a credit prize amount based on the credit prize symbols appearing in the outcome of the game, and provides the determined credit prize amount to a player.

In another aspect of the present invention, one or more non-transitory computer-readable storage media, having computer-executable instructions embodied thereon is provided. When executed by a processor, the computer-executable instructions cause the processor to display a game screen on a display unit including a grid having a plurality of cells arranged in a plurality of rows and columns. The processor displays the plurality of virtual reels in the grid with each virtual reel being displayed in a corresponding column. Each of the plurality of virtual reels includes a plurality of credit prize symbols. The processor spins and stops each of the plurality of virtual reels to display an outcome of the game. The processor detects an appearance of a special symbol in the outcome of the game, responsively determines a credit prize amount based on the credit prize symbols appearing in the outcome of the game, and provides the determined credit prize amount to a player.

In still another aspect of the present invention, a mobile computing device is provided. The mobile computing device includes a touch display unit, a memory device, and a processor. The touch display unit is configured to display game screens including computer generated images, a memory device storing a game execution program including computer instructions for generating computer-generated images of a plurality of virtual reels, and a processor for executing the game execution program to display a game screen on the display unit including a grid having a plurality of cells arranged in a plurality of rows and columns. The processor displays the plurality of virtual reels in the grid with each virtual reel being displayed in a corresponding column. Each of the plurality of virtual reels includes a plurality of credit prize symbols. The processor spins and stops each of the plurality of virtual reels to display an outcome of the game. The processor detects an appearance of a special symbol in the outcome of the game, responsively determines a credit prize amount based on the credit prize symbols appearing in the outcome of the game, and provides the determined credit prize amount to a player.

BRIEF DESCRIPTION OF DRAWINGS

FIG. 4 is an illustration of virtual reels that may be used with the game shown in FIGS. 3A-3B, according to an embodiment of the present invention.

FIG. 15 is an illustration of exemplary reel strip data file for use in generating virtual reels shown in FIG. 4 with symbol arrangements showing the order of symbols displayed on the display area of the game illustrated in FIGS. 3A-3B, according to an embodiment of the present invention.

FIG. 16 is an illustration of an exemplary variable symbol reel strip data file for use in selecting variable symbols used with the virtual reels shown in FIG. 4, according to an embodiment of the present invention.

FIG. 17 is an illustration of a variable symbol weight table that may be used in selecting variable symbols used with the virtual reels shown in FIG. 4.

FIG. 18 is an illustration of a symbol image data file that may be used with the game shown in FIGS. 3A-3B.

FIGS. 19-20 are illustrations of credit prize symbol image data files that may be used with the game shown in FIGS. 3A-3B.

FIGS. 21-22 are illustrations of credit prize symbol weight tables that may be used in selecting credit prize symbols used with the virtual reels shown in FIG. 4.

FIG. 23 is an illustration of exemplary unisymbol reel strip data file for use in generating independent unisymbol reels shown in FIGS. 32A-32C, according to an embodiment of the present invention.

FIGS. 24-27 are illustrations of bonus feature credit prize symbol weight tables that may be used in selecting credit prize symbols used with the independent unisymbol reels shown in FIGS. 32A-32C.

FIG. 28 is an illustration of a reel stop position data file that may be used to execute the game illustrated in FIGS. 3A-3B and FIGS. 31A-32C, according to an embodiment of the present invention.

FIG. 30 is an illustration showing one example of a paytable data file that may be used with the game illustrated in FIGS. 3A-3B.

Corresponding reference characters indicate corresponding parts throughout the drawings.

DETAILED DESCRIPTION OF EMBODIMENTS

A gaming machine, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming machine, a control method for a gaming machine, and a program for a gaming machine and/or mobile computing device that provides a game to a player.

The present invention improves the functionality of existing gaming machines by providing a game execution program including computer instructions executed by a processor to operate a game that includes a primary game including a plurality of virtual reels and a bonus feature event that includes a plurality of independent reels. The virtual reels include a plurality of game symbols that are used to determine a winning outcome of the game. In addition, the virtual reels include a plurality of credit prize symbol positions that are randomly populated with credit prize symbols. In addition, the virtual reels include a plurality of variable symbol positions that are configured to display randomly selected game symbols including a special symbol. If the special symbol is displayed in the outcome, a credit prize is awarded based on the credit prize symbols being displayed in the outcome. The bonus feature event is initiated when a trigger event is detected in the game outcome. The bonus feature event includes a plurality of independent reels that includes randomly selected credit prize symbols, and the special symbol. The game execution program improves the ability of existing game machines to vary the volatility of game outcomes by using random numbers to generate reels by populating the variable symbol positions and the credit prize symbol positions with randomly selected symbols. Thus, increasing the flexibility of providing bonus credit awards to players during the bonus feature event, and increasing the player's interest in playing the game. In addition, the present invention improves existing gaming machines by providing reel strip layout files that include variable symbol positions that allow for varied arrangements of game symbols, thus reducing the amount of computing resources required to render the virtual reels for display.

Figure 1A:
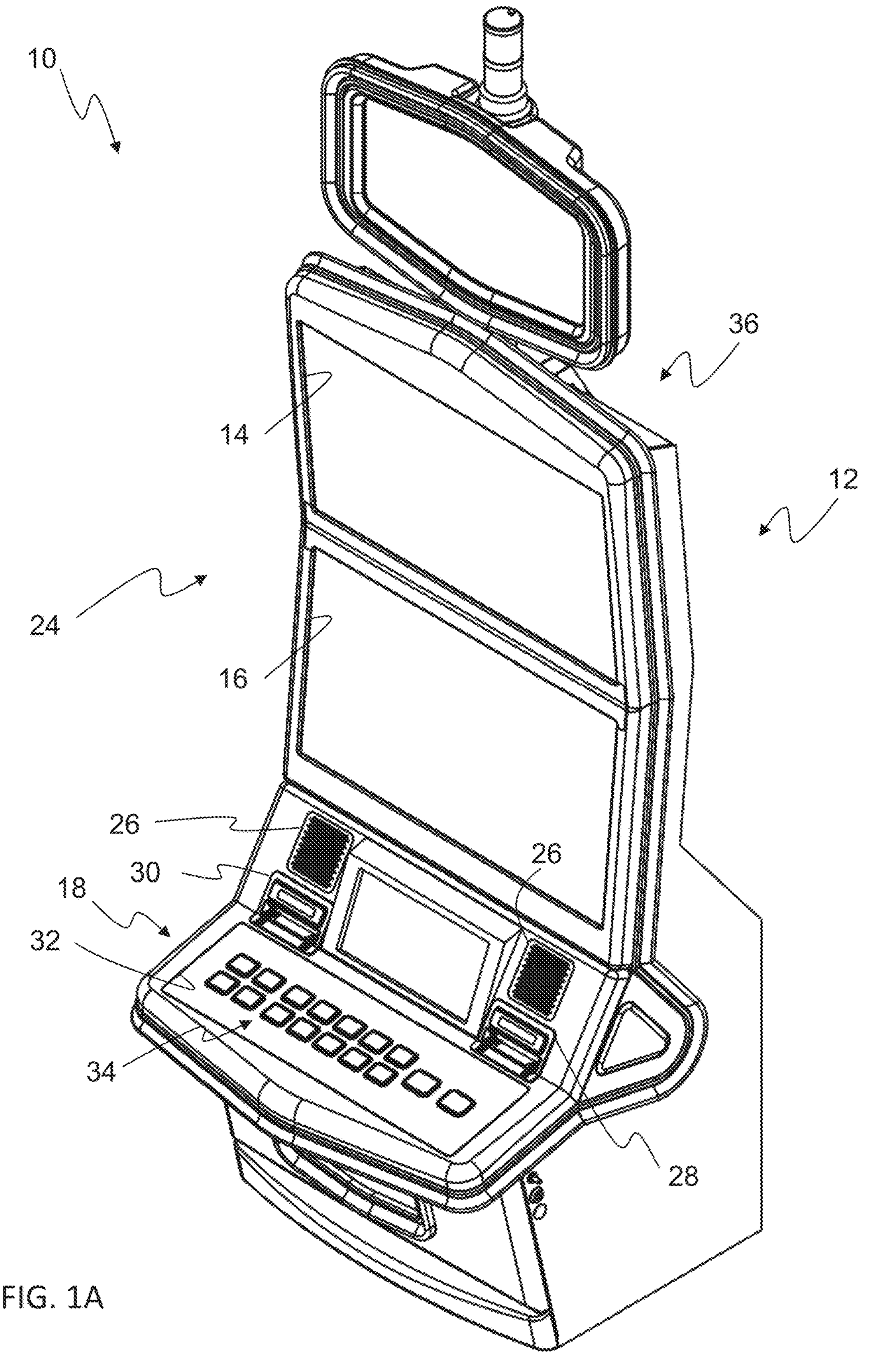
FIG. 1A is a perspective view of the gaming machine, according to the first embodiment.
Figure 1B:
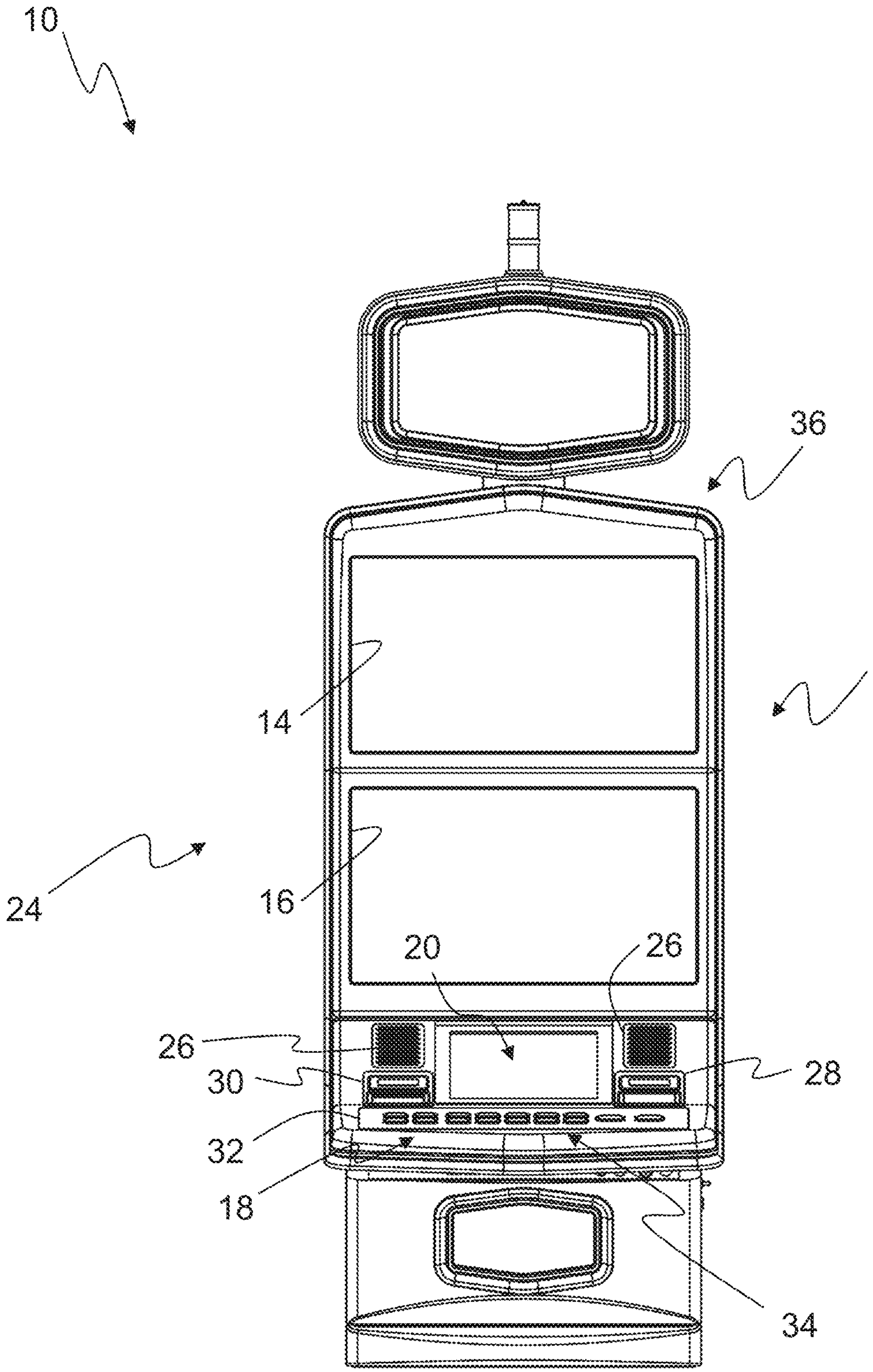
FIG. 1B is a front view of the gaming machine of FIG. 1A.

The gaming machine according to the present embodiment, receives a predetermined game value from the player, generates a game result, and provides a payout to the player according to the game result and one or more pay tables. FIG. 1A and FIG. 1B are a perspective view and a front view, respectively, of a gaming machine 10, according to the present embodiment. As shown in FIGS. 1A and 1B, this gaming machine 10 provides a cabinet 12 providing an upper display 14, a lower display 16, and a control panel 18 and may also house a player tracking or ranking unit 20. The cabinet 12 also houses a game control unit 22 (see FIG. 2) that controls each part (see below). The control unit 22 also implements a random number generator (RNG) that is used during operation of the game. Each configuration is described below.

The upper display 14 and the lower display 16 may be flat panel display devices, such as both liquid crystal display devices and organic EL display devices and the like, and by controlling via each control unit 22, the display area mentioned below functions as a display unit 24 provided to the player.

Speakers 26 are provided on the left and right of the cabinet 12, and by controlling via the control unit 22, sound is provided to the player. On the control panel 18, a bill/ticket identification device 28, a printer device 30, and an operation unit 32 are provided.

The player tracking unit 20 may be housed on the center of the front surface of the cabinet 12 below the lower display 16. The player tracking unit 20 has a card reader that recognizes a player identification card, a display that presents data to the player, and a keypad that receives input by the player. This type of player tracking unit 20 reads information recorded on the player identification card inserted by the player into the card reader, and displays the information and/or information acquired by communicating with the external system on the display, by cooperatively operating with the control unit 22 mentioned below or an external system. Further, input from the player is received by the keypad, the display is changed according to the input, and communication with the external system is carried out as necessary.

The bill/ticket identification device 28 is disposed on the control panel 18 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification device 28, receives and identifies bills/tickets (including vouchers and coupons) that are the game value as a game executing value, and notifies the control unit 22 mentioned below.

The printer device 30 is disposed on the control panel 18 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer device 30, under the control of the control unit 22 mentioned below, prints information on paper and outputs a ticket according to credit payout processing from the gaming machine 10. The output ticket can use the payout credit as game play by being inserted into the bill/ticket identification device 28 of another gaming machine, or, can be exchanged for cash by a kiosk terminal inside of the casino or a casino cage.

The operation unit 32 receives the operation of the player. The operation unit 32 includes a group of buttons 34 that receives various instructions from the player on the gaming machine 10. The operation unit 32, for example, may include a spin button and a group of setting buttons. The spin button receives an instruction to start (start rotating the reel) an instance of the game. The group of setting buttons 34 includes a group of bet buttons, a denomination button, a group of line-designation buttons, a max bet button, and a payout button and the like. The group of bet buttons receives an instruction operation regarding the bet amount of credits (bet number) from the player. The group of line-designation buttons receive an instruction operation that designate a pay line subjected to a line judgment below from the player. The max bet button receives an instruction operation regarding the bet of the maximum amount of credits that can be bet at one time from the player. The payout button receives an instruction operation instructing a credit payout accumulated in the gaming machine 10. The gaming machine 10 also includes illumination devices 36 that provides decorative lighting to the gaming machine 10.

In one embodiment, referring to FIGS. 1A and 1B, the control panel 18 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 24 and/or the player tracking unit 20, the paper money/ticket identification device 28, the operation unit 32, the player tracking unit 20, a coin slot, a ticket in ticket out (TITO) system, a bill acceptor, and/or any suitable device that enables the gaming machine 10 to receive media associated with a monetary value and establish a credit balance for use in playing the gaming machine 10. In one embodiment, the acceptor device may be configured to receive physical media such as, for example, a coin, a medal, a ticket, a card, a bill, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein.

For example, in one embodiment, the coin slot may include an opening that is configured to receive coins and/or tokens deposited by the player into the gaming machine 10. The control unit 22 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

Figure 2:
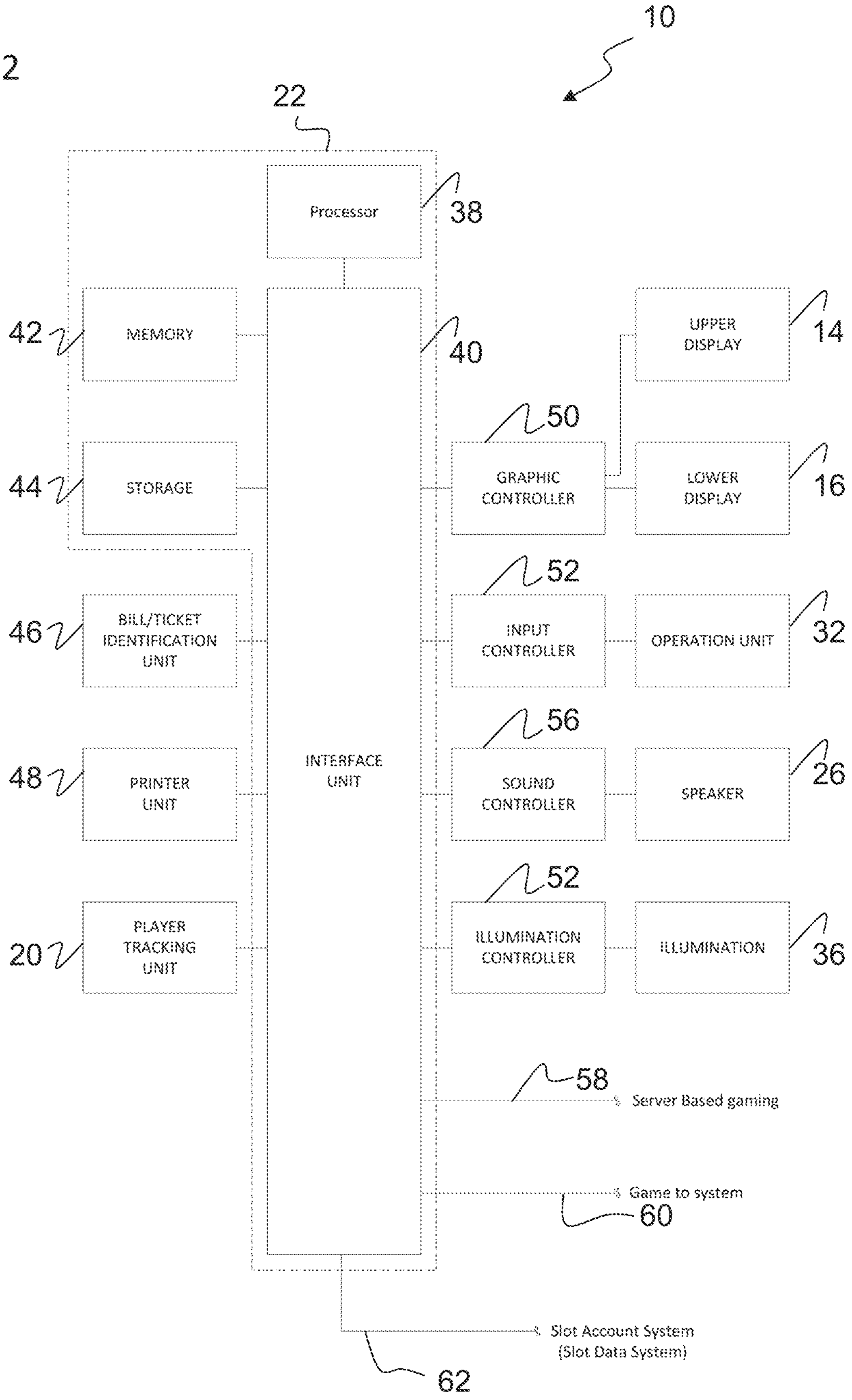
FIG. 2 is a functional block diagram of the gaming machine in FIG. 1A.

With reference to FIGS. 1A, 1B, and 2, further on the inside of cabinet 12, a control board equipped with a central processing unit 38 (abbreviated as CPU below) including a processor that configures the control unit 22, an interface unit (or part) 40, a memory device including a memory 42 and a storage 44, and the like are incorporated. The control board is configured so that communication is possible through the interface unit 40 and each of the components equipped on the cabinet 12, controls the operation of each part by executing the program recorded in the memory 42 or the storage 44 of the CPU 38, and provides a game to the player. The function of the CPU 38 is to execute and display the game on the displays 14, 16 of the gaming machine 10.

FIG. 2 shows a functional block diagram of the gaming machine 10, according to the present embodiment. The gaming machine 10 provides the control unit 22. The control unit 22 is configured as the interface unit 40 including a chip set providing communication functions of the CPU 38, a memory bus connected to a CPU 38, various expanding buses, serial interfaces, USB interfaces, Ethernet (registered trademark) interfaces and the like, and a computer unit where the CPU 38 provides the addressable memory 42 and the storage 44 through the interface unit 40. The memory 42 can be configured to include RAM that is a volatile storage medium, ROM that is a nonvolatile storage medium, and EEPROM that is a rewritable nonvolatile storage medium. The storage 44 provides the control unit 22 as an external storage device function, can use reading devices such as a memory card that is a removable storage medium, and a magneto optical disk and the like, and can use hard disks.

On the interface unit 40, in addition to the CPU 38, the memory 42, and the storage 44, a bill/ticket identification unit controller 46, a printer unit controller 48, the player tracking unit 20, a graphic controller 50, an input controller 52, and a sound controller 54 are connected. That is, the control unit 22 is connected to the operation unit 32 through the input controller 52, and connected to the upper display 14 and/or the lower display 16 through the graphic controller 50. Further, when illumination devices 36 that provides decorative lighting to the gaming machine 10 is provided, the illumination is controlled under the control of the control unit 22 on the interface unit 40, and an illumination controller 56 that controls the illumination devices 36 to provide a decorative lighting effect may be connected.

The control unit 22, which includes memory 42 and storage 44, controls each part by executing a program stored in the memory 42 and the storage 44, and provides a game to the player. Here, for example, the memory 42 and storage

44 may be configured to store a program and data of an operating system and subsystem that provide the basic functions of the control unit 22 to the EEPROM of the memory 42, and stores a program and data of an application that provides a game to the storage 44. According to such a configuration, it can be easy to change or update a game by replacing the storage 44. Further, the control unit 22 may be a multiprocessor configuration that has a plurality of CPUs.

Each block connected to the control unit 22 is described below. The bill/ticket identification unit controller 46 operates the bill/ticket identification device 28 to receive bills/tickets in the insertion opening, and notifies the control unit 22 of identifying information corresponding to the assortment of bills or the payout processing of credits. The bill/ticket identification unit controller 46 notifies the information to the control unit 22, and the control unit 22 increases the usable credit amount inside of the game according to the notified content. The printer unit controller 48 corresponds to the printer device 30, and under the control of the control unit 22 that receives an operation of the payout button of the group of setting buttons 34, information corresponding to the credit payout processing from the gaming machine 10 is printed and output on a printed ticket.

The player ranking (or tracking unit) unit 20 cooperatively operates with the control unit 22, and sends and receives information and the like of the player from the casino management system. The graphic controller 50 controls the upper display 14 and the lower display 16, under the control of the control unit 22, and displays a display image that includes various graphic data. The sound controller 54 drives the speakers 26 under the control of the control unit 22, and provides various sounds such as an announcement, sound effects, BGM and the like.

Further, the interface unit 40, has various communication interfaces for communicating with the exterior of the gaming machine 10, for example the interface unit 40 can communicate with an external network by Ethernet 58, 60, and a serial interface 62. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Figure 3A:
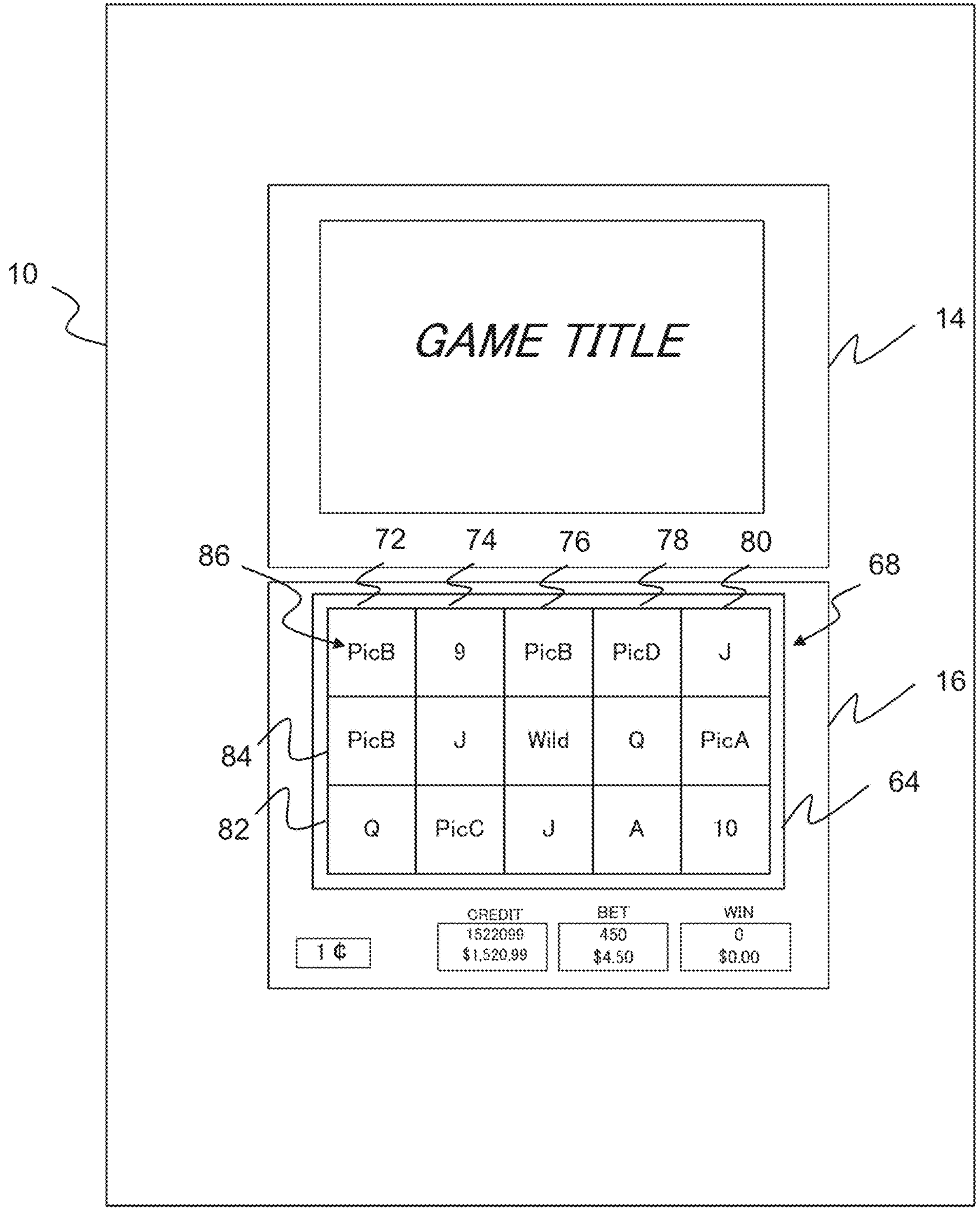
FIGS. 3A-3B are illustrations of a game displayed on a display area of the gaming machine in FIGS. 1A-2, according to an embodiment of the present invention.
Figure 3B:
Figure 5:
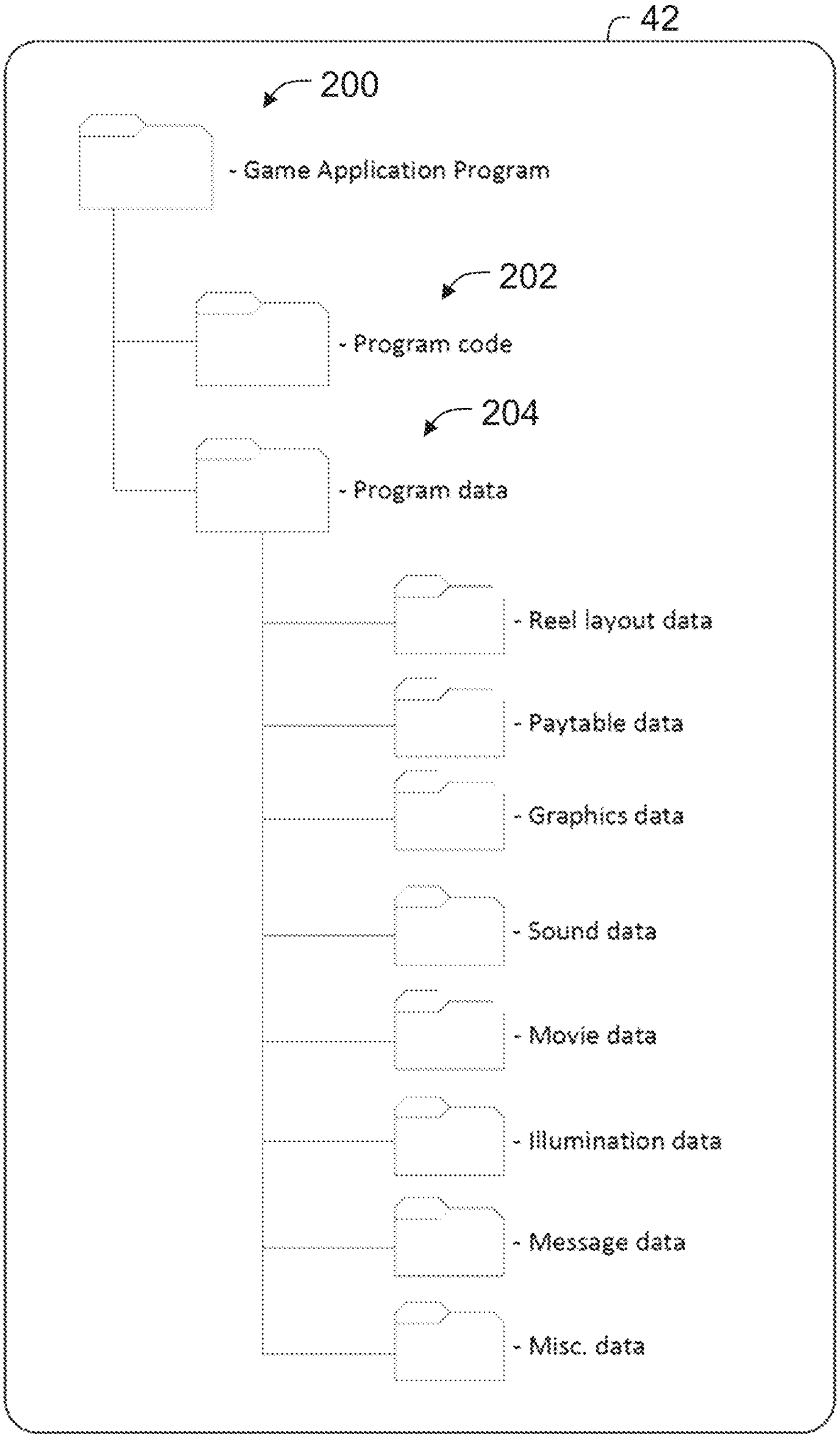
FIGS. 5-8 are block diagrams of a game control unit that may be used with to perform the function of executing a game on the gaming machine shown in FIGS. 1A-2.
Figure 6:
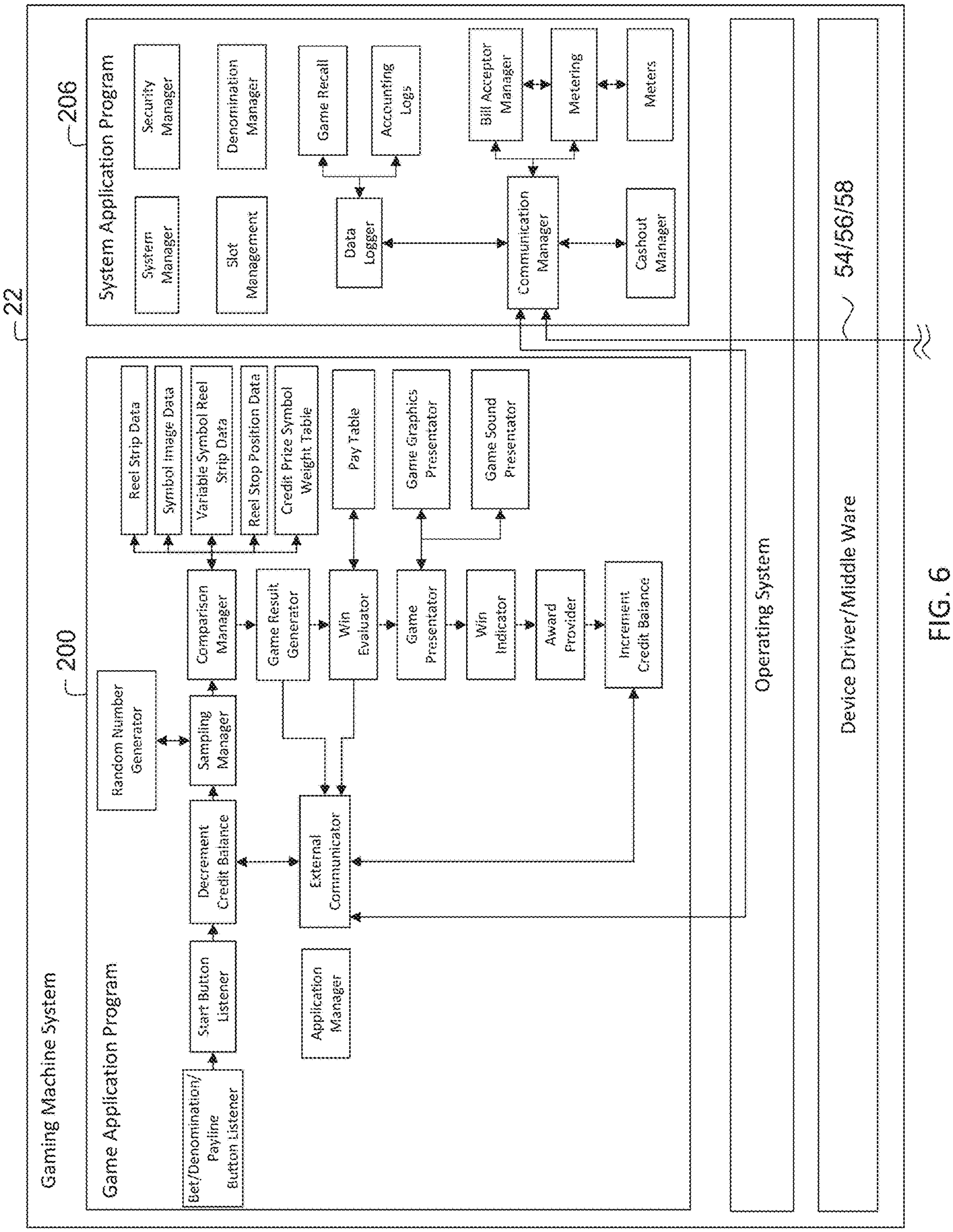
Figure 7:
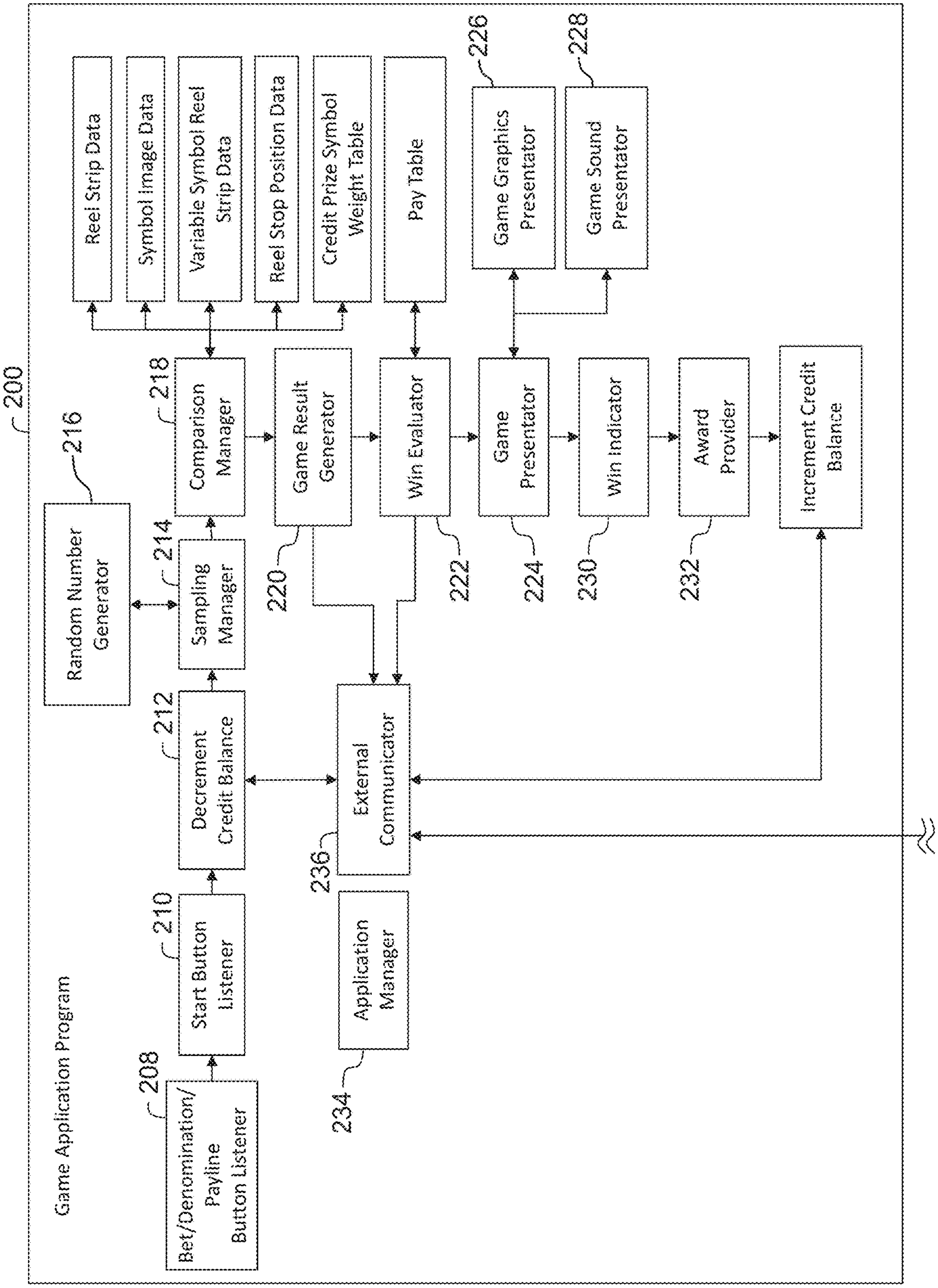
Figure 8:
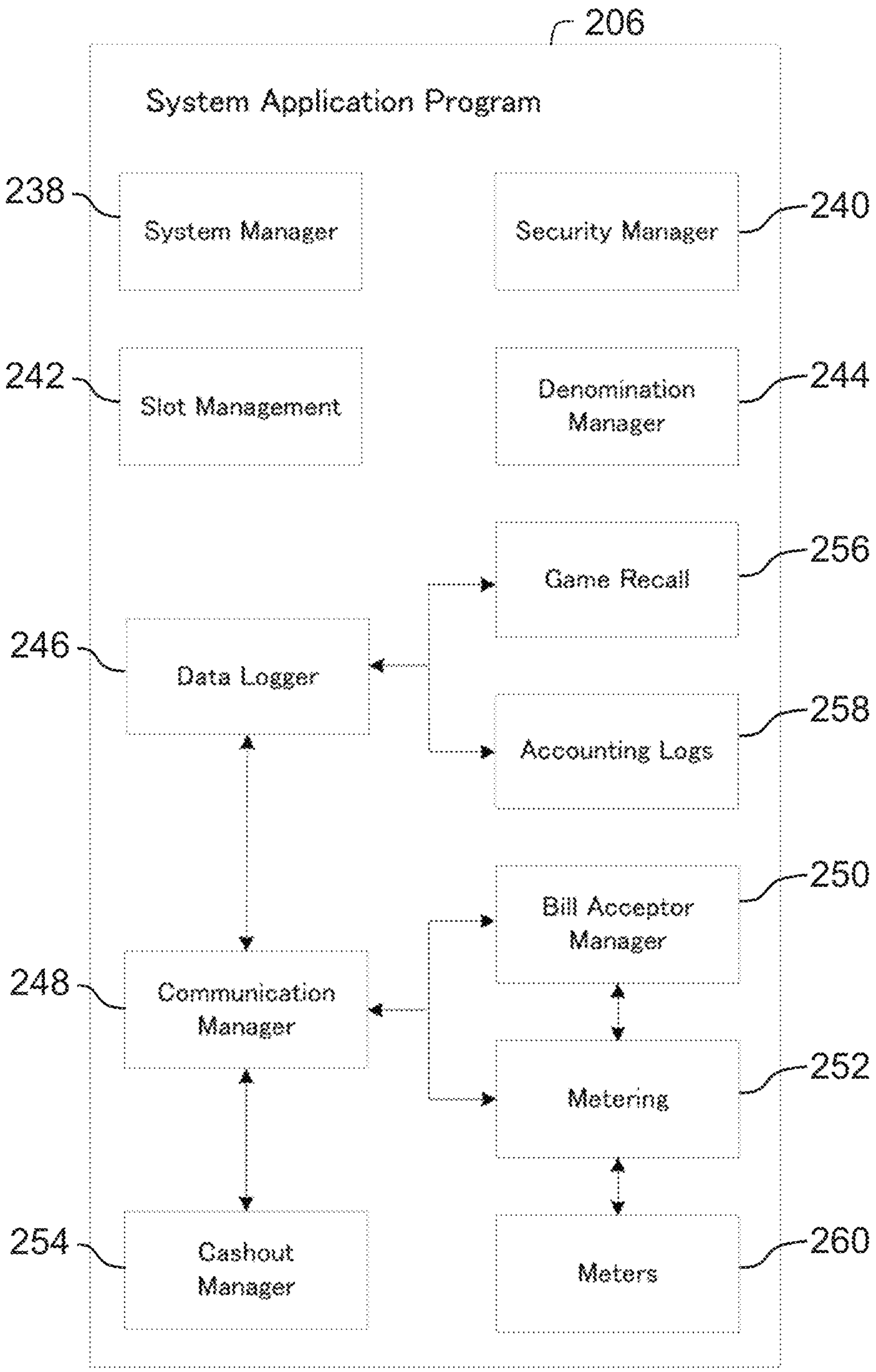

FIGS. 3A-3B schematically shows a display area 64 provided by the gaming machine 10. Such a display area 64 is displayed on the display unit 24 (the upper display 14 and/or the lower display 16) by the control unit 22 executing a predetermined program. In the illustrated embodiment, the display area 64 is displayed on the lower display 16. For instance, as shown, during a game, the upper display 14 may be utilized to display game related information, e.g., game title information and/or graphics.

In one aspect of the present invention, the control unit 22 executes a game execution program to provide a game 66 that includes a primary game 68 and a bonus feature event 70 (shown in FIGS. 31A-32C). The control unit 22 displays a game screen within the display area 64 that includes the primary game 68 and the bonus feature event 70. In the illustrated embodiment, the primary game 68 and the bonus feature event 70 are displayed on the lower display 16. The upper display 14 may be used to display animations and/or game identifying information during the game and/or during an attract mode. Further, the lower display 16 may display a decorative area, and an area that displays credit amount, bet number, and a credit amount obtained by winning (WIN number) and the like. In another embodiment, the primary game 68 may be displayed in the lower display 16 and the bonus feature event 70 may be displayed in the upper display 14.

In the illustrated embodiment, the primary game 68 includes a video slot game using a plurality of virtual reels 72, 74, 76, 78, 80 (shown in FIGS. 3A-4). The video slot game utilizes a grid 82 in the display area 64. The illustrated embodiment shows the state of displaying the display area 64 in the lower display 16. By using such a display area, the gaming machine 10 of the present embodiment operates as a slot machine that pays a payout according to a winning combination of symbols displayed on the display area 64.

The display unit 24 displays a plurality of game symbols in the grid 82. The grid 82 has a plurality of rows (r) and columns (c). The grid 82 is configured by a plurality of cells 84 that are the stop position of symbols. On each of the plurality of cells 84 of the display area 64, one symbol is stopped and displayed.

In the illustrated embodiment, the grid 82 is displayed with fifteen cells 84 arranged in three rows and five columns, and the control unit 22 generates five virtual reels 72, 74, 76, 78, 80 for use in displaying the primary game 68. On each cell 84 of the grid 82, as shown in FIGS. 3A and 3B, a game symbol 86 is displayed based on the symbol arrangement of virtual reels including virtual reels 72, 74, 76, 78, 80 (also shown in FIG. 4) configured as a virtual reel set 88. That is, the cells 84 of the grid 82 correspond to the virtual reels 72 to 80, by column, and the game symbols 86 disposed on predetermined parts of each virtual reels 72 to 80 are displayed. In the illustrated embodiment, each of the virtual reels 72 to 80 displays multiple symbols within a corresponding column with the virtual reel in a stopped position. For example, as shown in FIGS. 3A and 3B, when stopped, each virtual reel 72 to 80 displays 3 game symbols within each corresponding column. Furthermore, by moving (scrolling or spinning) each game symbol 86 by column based on the symbol arrangement of the virtual reels 72 to 80, the game symbols 86 displayed in the cells 84 of the grid 82 change, and by stopping the movement (scrolling or spinning) by columns, the game symbols 86 are stopped. Here, the virtual reels 72 to 80 are data where the control unit 22 uses a program having the memory 42 or the storage 44, and data showing the symbol arrangement (i.e., the order of symbols on each reel strip) regulated by each cell column. Further, the virtual reel set 88 is a general term for such virtual reels 72 to 80.

The control unit 22 generates each virtual reel 72 to 80, in the examples of FIGS. 3A and 3B using a reel strip data file 90 and symbol image data files 92, 94, and 96 stored in memory 42 and/or storage 44 (shown in FIGS. 15 and 18-20). The reel strip data file 90 includes a reel designation 98 associated with each virtual reel 72 to 80 and sequential symbol position logic cells 100 associated with each reel designation 98. Each symbol position logic cell 100 includes indicators for rendering the virtual reels with a plurality of game symbols. The reel strip data file 90 includes information associated with a plurality of reel strips 102, 104, 106, 108, 110 that correspond to each virtual reel 72 to 80, and are used to generate virtual reel 72 to 80. Each reel strip 102, 104, 106, 108, 110 includes a number of symbol positions 112 configured to be populated by game symbols 86 that are selected from symbol image data files 92, 94, and 96 stored in memory 42 and/or storage (shown in FIGS. 18-20). The reel strips 102-110 also include reel stop positions 114 associated with each symbol position 112. The symbol positions 112 and the corresponding game symbols 86 are arranged in an order defined by each reel strip 102, 104, 106,

108, 110. In addition, one or more reel strips 102, 104, 106, 108, 110 includes a different number of symbol positions 112.

In the illustrated embodiment, each reel strip 102, 104, 106, 108, 110, includes a plurality of fixed symbol positions 116 for displaying game symbols 86. Each fixed symbol position 116 includes instructions for displaying a predefined game symbol 86 selected from a set of game symbols 86 included in a game symbol image data file 92. For example, for each play of the game, the fixed symbol positions 116 have an associated predefined game symbol 86 from a symbol set 118. The game symbol image data file 92 includes the details of game symbols 86 populating the fixed symbol positions 116 and includes varieties of game symbols 86. This symbol set 118 includes card symbols ("9", "10", "J", "Q", "K", and "A") that imitate playing cards as regular symbols, and picture symbols ("PicA", "PicB", "PicC", and "PicD") that show a pattern. Further, this symbol set 118 includes a wild symbol ("Wild") that is substituted as another symbol when a win combination is determined and a special symbol 120 ("Special") that may be used to determine if a game feature is to be provided. Each of these symbols have a different rank from each other regarding their value when winning, their rank gradually raises in this order: "9", "10", "J", "Q", "K", "A", "PicE", "PicD", "PicC", "PicB", "PicA". A combination of symbols that includes high-ranking symbols when winning, can obtain a larger winning payout compared to a combination of low-ranking symbols when winning.

In the illustrated embodiment, each reel strip 102, 104, 106, 108, 110 includes a plurality of variable symbol positions 122 that display a varying inner symbol ("inner"). The variable symbol positions 122 are populated using a variable symbol reel strip data file 124 (shown in FIG. 16) and/or a variable symbol weight table 126 (shown in FIG. 17). The variable symbol reel strip data file 124 includes a variable symbol reel strip 128 that includes a number of symbol positions 112 populated by game symbols 86 that are selected from game symbol image files 92, and stop positions 114 associated with each symbol position 112. In the illustrated embodiment, the variable symbol reel strip 128 includes game symbols selected from a predefined group of symbols including "9", "10", "J", "Q", "K", "A", "PicE", "PicD", "PicC", "PicB", "PicA", and "Special". As shown in FIG. 16, in the illustrated embodiment, the variable symbol reel strip 128 includes twenty-one symbol positions 112 including eleven symbol positions 112 populated with the special symbol 120, and the remaining ten symbol positions 112 populated with "9", "10", "J", "Q", "K", "A", "PicE", "PicD", "PicC", "PicB", and "PicA".

In one embodiment, when generating the virtual reels 72 to 80, the control unit 22 is programmed to populate the variable symbol positions 122 by randomly selecting game symbols from the predefined group of symbols using the variable symbol reel strip 128. For example, the control unit 22 may be programmed to randomly select a stop position 114 of the variable symbol reel strip 128, select the symbol position 112 associated with the randomly selected stop position 114, and populate the variable symbol position 122 with the game symbol 86 associated with the selected symbol position 112.

In another embodiment, the control unit 22 may be programmed to use the variable symbol weight table 126 to randomly select a game symbol to populate variable symbol positions 122. The variable symbol weight table 126 includes a plurality of selection weights 130 (e.g. selection probabilities) associated with each game symbol 86 in the predefined group of symbols. In addition, the variable symbol weight table 126 includes two sets of selection weights 130 including a first set 132 of selection weights 130 that is associated with a first predefined group of symbols that includes the special symbol 120, and a second set 134 of selection weights 130 that is associated with a second predefined group of symbols that does not include the special symbol 120. During operation, when generating the virtual reels 72 to 80 using the variable symbol weight table 126, the control unit 22 may be programmed to randomly select game symbols based on the corresponding selection weights 130 and random numbers.

In the illustrated embodiment, each reel strip 102, 104, 106, 108, 110 includes a plurality of credit prize symbol positions 136 that display credit prize symbols 138 ("prize"). The credit prize symbols 138 are selected from the group of credit prize symbols included in credit prize symbol image data files 94 and 96 (shown in FIGS. 19-20) that are stored in the memory device. Each credit prize symbol position 136 is populated with a randomly selected credit prize symbol 138 that is selected using credit prize symbol weight tables 140 and 142 (shown in FIGS. 21 and 22). Each credit prize symbol 138 includes an associated credit prize value including an amount of credits that may be awarded to the player during an instance of the game. The credit prize symbol weight tables 140 and 142 include a plurality credit prize symbols 138 and a plurality of selection weights (e.g. selection probabilities) associated with each credit prize symbol 138. In addition, each credit prize symbol weight table 140 and 142 may be used based on a credit value of a wager being placed by the player on an instance of game. For example, upon determining that a player has placed a minimum wager value and/or place a bet having a wager value that is less than a maximum bet value, the control unit 22 may generate the virtual reels 72 to 80 using a minimum bet value credit prize symbol weight table 140. In addition, if the player has placed a maximum wager value on an instance of game or placed a predefined bet amount, the control unit 22 may generate the virtual reels 72 to 80 using a maximum bet value credit prize symbol weight table 142. As illustrated in FIGS. 21 and 22, the maximum bet value credit prize symbol weight table 142 may include one or more credit prize symbols 138 that are different than the credit prize symbols 138 included in the minimum bet value credit prize symbol weight table 140. In addition, the maximum bet value credit prize symbol weight table 142 may include one or more selection weights that are different than the selection weights included in the minimum bet value credit prize symbol weight table 140.

In the illustrated embodiment, each of credit prize symbol weight tables 140 and 142 include a plurality active credit prize symbols 144 (shown in FIG. 19) and a plurality of inactive credit prize symbols 146 (shown in FIG. 20). Each inactive credit prize symbol 146 includes a corresponding amount of credits that are awarded to the player upon the appearance of the inactive credit prize symbol 146 and the special symbol 120 in the outcome of an instance of a game. For example, in one embodiment, the control unit 22 may spin and stop the plurality of virtual reels 72 to 80 to display an outcome of an instance of the primary game 68. Upon detecting the appearance of an inactive credit prize symbol 146 in the outcome of a game, the control unit 22 is programmed to award the corresponding amount of credits only if the special symbol 120 also appears in the outcome of the game. Upon detecting the appearance of the special symbol 120 in the game outcome, the control unit 22 is programmed to detect the inactive credit prize symbols 146 also appearing in the game outcome, and award the player an amount of credits associated with the inactive credit prize symbols 146 appearing in the game outcome. If the inactive credit prize symbols 146 appear in the game outcome and the special symbol 120 does not appear in the game outcome, the amount of credits associated with the inactive credit prize symbols 146 is not awarded.

Each active credit prize symbol 144 includes a corresponding amount of credits that are awarded to the player upon the appearance of an active credit prize symbol 144 in the outcome of an instance of a game, regardless of whether the special symbol 120 appears on the game outcome. Upon detecting the appearance of an active credit prize symbol 144 in the outcome, the control unit 22 is programmed to award the player the amount of credits displayed with the active credit prize symbol 144 appearing in the outcome.

In the illustrated embodiment, the minimum bet value credit prize symbol weight table 140 also includes a plurality of locked credit prize symbols 148 (shown in FIG. 20) and a plurality of unlocked credit prize symbols 150. The unlocked credit prize symbols 150 include active credit prize symbols 144 and inactive credit prize symbols 146. Each locked credit prize symbol 148 includes a corresponding amount of credits that are not available to be awarded to the player. For example, locked credit prize symbols 148 appearing in the outcome of the game display credit amounts that are "locked" and not awarded to the player. The use of locked credit prize symbols 148 are intended to persuade the player to increase the amount of bet on the game. For example, the maximum bet value credit prize symbol weight table 142 does not include locked credit prize symbols 148. The image associated with a locked credit prize symbols 148 may include an indication of the predefined bet amount required to access the maximum bet value credit prize symbol weight table 142, thus encouraging players to increase the bet per line wager amount to access larger credit prize awards.

During the primary game 68, the credit prize symbols 138 may also serve as a trigger symbol that indicate a triggering event that initiates the bonus feature event 70 when the triggering event occurs during the primary game 68. For example, in one embodiment, the control unit 22 may be programmed to initiate the bonus feature event 70 when a plurality of credit prize symbols 138 appear in an outcome of the primary game 68.

It should be noted that in one aspect of the present invention, one or more dynamic virtual reel strips may be utilized. Using virtual reel strips, the symbols and/or symbol positions and/or virtual reel strips and/or length or size and/or any aspect of a virtual reel strip may change from one spin or play to the next. For example, a dynamic reel strip includes a plurality of symbol positions with symbols from the symbol set 118 and a plurality of variable symbol positions. The variable symbol positions may be in the form of one or more stacks, i.e., adjacent symbol positions. In one embodiment, the location and/or size of the stacks may change from one spin to the next, either randomly and/or in a predetermined pattern.

Alternatively, a virtual reel strip associated with a column of cells may be dynamically changed from one spin or play to another spin or play. This, may occur randomly, every spin or play and/or in a predetermined pattern.

It should be noted that in the illustrated embodiment, each column of the grid 82 has a corresponding reel. When the reel stops, a symbol from the respective reel appears in each one of the cells of the respective column of the grid 82. One or more of the reels 72 to 80 may be identical or all of the reels 72 to 80 may be different.

In the next several embodiments, the present invention will be described with respect to a 3×5 grid, however, it should be noted that the present invention is not limited to a grid with any specific size and/or shape.

Referring to FIGS. 31A-32C, in the illustrated embodiment, the bonus feature event 70 includes a plurality of independent unisymbol reels 152 that are displayed in the grid 82. For example, in one embodiment, when displaying the bonus feature event 70, the control unit 22 transitions the game screen 64 from displaying the five virtual reels 72, 74, 76, 78, 80 to displaying fifteen independent unisymbol reels 152. Each unisymbol reel 152 is displayed in a corresponding cell 84 and is configured to display a single game symbol 86 when the corresponding independent unisymbol reel 152 is in a stopped position.

The control unit 22 generates each independent unisymbol reel 152 using a unisymbol reel strip data file 154 (shown in FIG. 23) and a plurality of bonus feature prize symbol weight tables 156, 158, 160, 162. (shown in FIGS. 24-27). The unisymbol reel strip data file 154 includes a plurality of unisymbol reel strips including a primary unisymbol reel strip 164, "Reel Strip A", and a special unisymbol reel strip 166, "Reel Strip B". The primary unisymbol reel strip 164 and the special unisymbol reel strip 166 each include a plurality of sequential symbol position logic cells 100 that includes indicators for rendering the unisymbol reels with a plurality of symbols. Each sequential symbol position logic cells 100 is associated with a symbol position 112 that is configured to be populated by credit prize symbols 138 that are selected from the credit prize symbol image data files 94 and 96. The primary and special unisymbol reel strips 164, 166 also include reel stop positions 114 associated with each symbol position 112. In the illustrated embodiment, the primary and special unisymbol reel strips 164, 166 each include a plurality of active prize symbol positions 168, "ACTIVE", and a plurality of inactive prize symbol positions 170, "INACTIVE". Each active prize symbol position 168 is populated with symbols that are randomly selected from a group of active prize symbols 144 ("Active Prizes") included in the bonus feature prize symbol weight tables 156, 158, 160, 162. Each inactive prize symbol position 170 is populated with symbols that are randomly selected from a group of symbols that include inactive prize symbols 146 and locked prize symbols 148 ("Inactive Prizes") included in the bonus feature prize symbol weight tables 156, 158, 160, 162.

The active and inactive prize symbol positions 168, 170 are arranged in a predefined order defined by each unisymbol reel strip 164, 166. In the illustrated embodiment, the primary unisymbol reel strip 164 includes a number of symbol positions that is greater than a number of symbol positions included in the special unisymbol reel strip 166. In other embodiments, the primary unisymbol reel strip 164 may include a number of symbol positions that is less than, or equal to, the number of symbol positions included in the special unisymbol reel strip 166. In the illustrated embodiment, the special unisymbol reel strip 166 also includes a special symbol position 172 that is populated with the special symbol 120.

The control unit 22 is programmed to randomly select credit prize symbols 138 using the bonus feature prize symbol weight tables 156, 158, 160, 162, and populate the symbol positions of the primary and the special unisymbol reel strips 164, 166 with the randomly selected credit prize symbols 138. In the illustrated embodiment, the control unit 22 is programmed to use a different bonus feature prize symbol weight table for each of the primary and the special unisymbol reel strips 164, 166. For example, the bonus feature prize symbol weight tables may include a plurality of primary unisymbol reel weight tables 156 and 160 that are used to populate the primary unisymbol reel strip 164, and a plurality of special unisymbol reel weight tables 158 and 162 that are used to populate the special unisymbol reel strip 166. In addition, the control unit 22 may be programmed to use different weight tables based on the credit value of a wager being placed by the player on an instance of game. For example, the control unit 22 may be programmed to use a primary minimum bet value symbol weight table 156 to populate the primary unisymbol reel strip 164 and a special minimum bet value symbol weight table 158 to populate the special unisymbol reel strip 166, upon determining that a player has placed a minimum wager value and/or placed a bet having a wager value that is less than a maximum bet value. The control unit 22 may also be programmed to use a primary maximum bet value symbol weight table 160 to populate the primary unisymbol reel strip 164 and a special maximum bet value symbol weight table 162 to populate the special unisymbol reel strip 166, upon determining that the player has placed a maximum wager value on an instance of game or placed a predefined maximum bet amount. In addition, each of the bonus feature prize symbol weight tables 156, 158, 160, 162 may include different active prize symbols 144, inactive prize symbols 146, and/or locked prize symbols 148 having different credit values and/or selection weights.

In general, the control unit 22 starts an instance of the primary game 68 and determines the stop position of each virtual reels 72 to 80 randomly using a reel stop position data file 174 (shown in FIG. 28) stored in the memory device. The virtual reels 72 to 80 that are displayed in the display unit 24 (for example, the lower display 16) are moved from a current position, and stopped based on a stop position to express an outcome of the primary game. Due to this, in the display or grid 82, the symbols included on the virtual reels 72 to 80 are continuously moved (scrolled or spun) in a vertical direction of the display area 64, and one symbol of one cell 84 is aligned in an order of the symbol based on the symbol arrangement is stopped so that it is displayed.

The control unit 22 changes and stops the plurality of symbols displayed on the display unit 24 according to the operation of the player received by the operation unit 32, and a payout may be paid according to the stopped symbols inside the display area 64 and a pay line set 176 and paytable data file 178 (show in FIGS. 29-30) stored in the memory device.

In the display area 64, a pay line is set that is used when winning is determined. The pay line is set to be extended over the column on the right end from the cells of the column of the left end, and is a line that combines the plurality of cells 84 determining a win. The number of effective lines within the set pay line is selected by the operation of a group of line designation buttons included in the group of setting buttons 34 of the operation unit 32 for the player. The control unit 22, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 64 is set (see FIGS. 3A-3B). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line.

In addition, the control unit 22 is programmed to detect an appearance of the special symbol 120 in the outcome of the game and responsively determine a credit prize amount based on the credit prize symbols 138 appearing in the outcome of the game and provide the determined credit prize amount to a player. Moreover, more than a predetermined number of the credit prize symbols 138 form a trigger condition regardless of the pay line.

Figure 29:
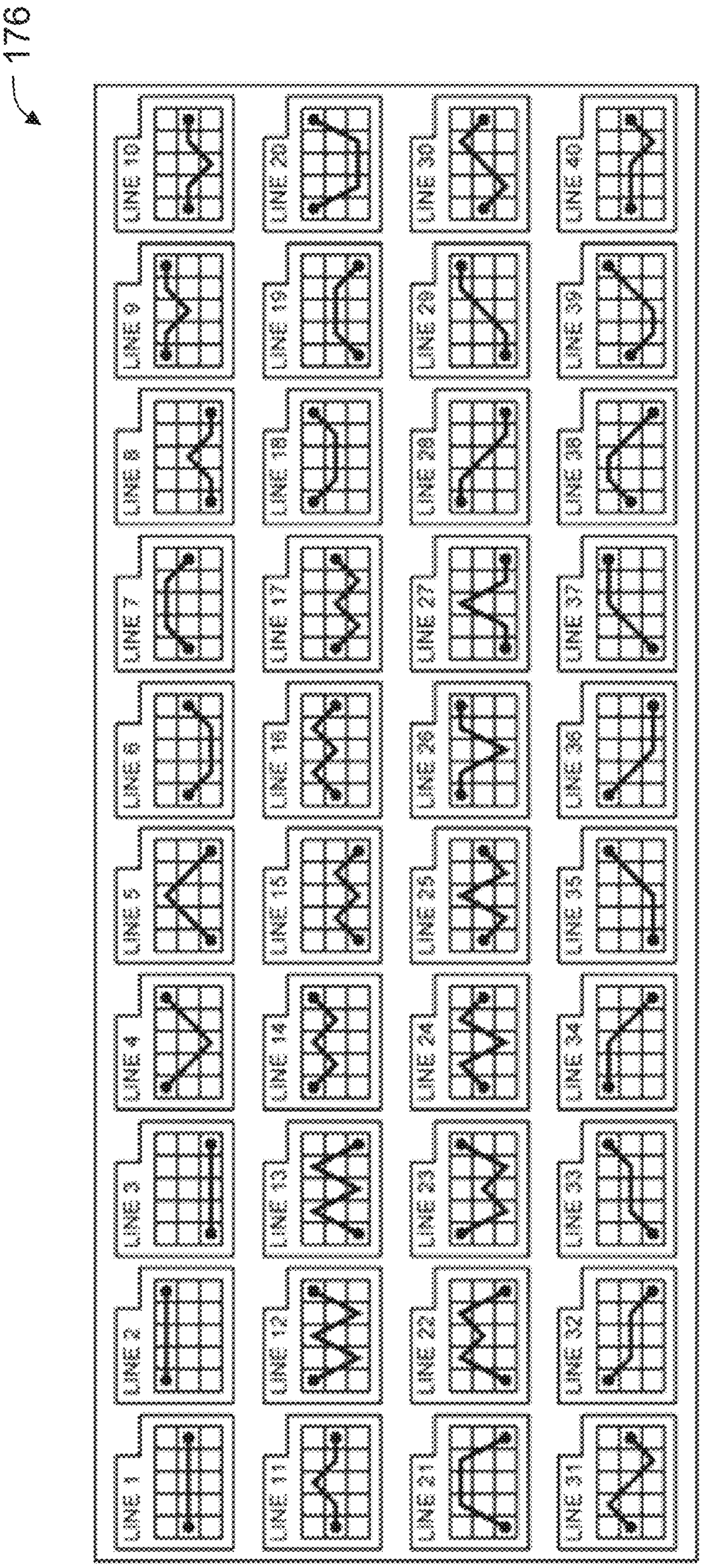
FIG. 29 is an illustration showing one example of a pay line set on the determination area of the game illustrated in FIGS. 3A-3B.

It should be noted that pay lines shown other than (or in addition to) the pay lines shown in FIG. 29 may be used. In general, the pay lines shown in FIG. 29 start in the first column and end in the last column, and include one cell per column. However, one or more pay lines could include one or more cells in the same column and may include a vertical pay line.

In the illustrated embodiment, the bonus feature event 70 includes a plurality of independent unisymbol reels 152 being displayed in the grid 82. Each unisymbol reel 152 includes a plurality of active credit prize symbols 144 and a plurality inactive credit prize symbols 146. At least one unisymbol reel 152 also includes the special symbol 120. In the illustrated embodiment, upon detecting the occurrence of the trigger condition, the control unit 22 transitions the game screen from the virtual reels 72, 74, 76, 78, 80 to the independent unisymbol reels 152 displayed in the grid 82. In addition, the control unit 22 detects the appearance of inactive prize symbols 146 being displayed within the cells 84 for the primary game 68 and "locks" the inactive prize symbol 146 in place.

The control unit 22 then spins the independent unisymbol reels 152 that are not "locked" to change the display of symbols and stops the independent unisymbol reels 152 to display an outcome of the bonus feature event 70. Upon stopping the independent unisymbol reels 152, the control unit 22 determines a credit prize award based on a credit value associated with each active prize symbol 144 being displayed in the bonus feature event outcome. In addition, the control unit 22 detects the appearance of the special symbol 120 being displayed in the bonus feature outcome and responsively provides an additional credit award based on a credit value of each inactive prize symbol appearing in the bonus feature event outcome. For example, the appearance of the special symbol 120 "unlocks" each inactive prize symbol 146 that is displayed in the outcome and provides the additional credit award based on a credit value of each "unlocked" inactive prize symbol 146. If the special symbol 120 is not displayed in the outcome, the control unit 22 "locks" any additional inactive prize symbols 146 being displayed and spins the remaining independent unisymbol reels 152 to display another instance of the bonus feature event 70. In one embodiment, the bonus feature event 70 continues until all cells 84 of the grid display inactive prize symbols 146.

Referring to FIGS. 5-8, in the illustrated embodiment, the memory 42 stores a game application program 200 that includes computer executable instructions that, when executed by the processor 38, cause the processor 38 to generate and display the game on the display unit 24 of the gaming machine 10. In one embodiment, the game application program 200 includes program code 202 and program object data 204 that includes computer executable instructions for implementing a game using the algorithms shown in FIGS. 11-14.

In the illustrated embodiment, the memory 42 stores the game application program 200 and a system application program 206 that includes computer executable instructions that, when executed by the processor 38, cause the processor 38 to generate and display the game on the display unit 24 of the gaming machine 10. The game application program 200 provides game specific/front-end functions and the system application program 206 program provides generic/back-end functions, when executed by the processor 38. In the illustrated embodiment, the game application program 200 and the system application program 206 are implemented on the same operating system. However, it should be noted that these programs may be implemented on different operating system and/or by different processors. In one embodiment, the game application program 200 includes a plurality of software modules including a bet/denomination/payline button listener module 208, a start button listener module 210, a credit balance manager module 212, a sampling manager 214, a random number generator 216, a comparison manager 218, a game result generator 220, a win evaluator 222, a game presentator 224, a game graphics presentator 226, a game sound presentator 228, a win indicator 230, an award provider 232, an application manager 234, and an external communicator 236. The game application program 200 may also include the reel strip data files, the symbol image data files, the variable symbol reel strip data files, the reel stop position data file, the credit prize symbol weight tables, the pay line set, and the paytable data file.

The bet/denomination/payline button listener module 208 is a software module for receiving a signal from the bet button, the denomination button, or the payline button which is generated by the button when a player operates the button to select number of bet, denomination, or number of paylines. In response to receiving the signal, the bet/denomination/payline button listener module 208 communicates the occurrence of the signal to application manager 234 for changing bet, denomination, or payline configuration of the game.

The start button listener module 210 is a software module for receiving a signal from the start button which is generated by the button when a player operates the button to start a game. In response to receiving the signal, the start button listener module 210 communicates the occurrence of the signal to application manager 234 for starting the game.

In response to receiving the signal from start button listener module 210, the application manager 234 requests the sampling manager 214 to obtain necessary number of random numbers from the random number generator 216.

The random number generator 216 generates random numbers based on predetermined algorithm of computational random generation method. The random number generator 216 may be a pseudorandom generator. In response to a request from sampling manager 214, the random number generator 216 returns random number. In some implementations, the random number generator 216 may be implemented in a central server. The random number generator 216 may be implemented as an integrated circuit or hard wired logic.

The comparison manager 218 compares the current state of the game or each random number with the reel strip data files, the symbol selection data files, the reel stop position data file, the pay line set, and/or the paytable data file and specifies corresponding reel layout, stop position, prize symbol, or trigger symbol based on each random number.

The game result generator 220 generates game result based on selected reel layout, stop positions of each reel, and bonus features.

The win evaluator 222 evaluates the game result with reference to the pay table.

The game presentator 224 provides game presentation process with visual and sound so as to form the predetermined game result finally.

The game graphics presentator 226 provides visual game presentation process on the display so as to form the predetermined game result finally.

The game sound presentator 228 provides sound presentation process by using sound controller and speakers.

The win indicator 230 indicates win combinations and payment condition of prize symbol formed in the game result.

The award provider 232 provides award credit to win meter based on the win evaluation.

The application manager 234 administrates activity and status of each software module. In addition, the application manager 234 administrates configuration, progress and states of the game application program 200.

The external communicator 236 communicates instruction and data with the system application program 206.

The credit balance manager module 212 executes a process for decrementing credit balance and incrementing credit balance based on win amount displayed in win meter.

In the illustrated embodiment, the system application program 206 provides back ground processing and functions other than game specific functions. The system application program 206 includes a plurality of software modules including a system manager 238, a security manager 240, a slot management module 242, a denomination manager 244, a data logger 246, a communications manager 248, a bill acceptor manager 250, a metering module 252, and a cashout manager 254.

The system application program 206 may also include a game recall file 256, accounting logs 258, and meters 260.

The system manager 238 is a software module for administrating all of the back ground processing and functions other than game specific functions conducted by the system application program 206.

The security manager 240 is a software module for administrating game verification, door security and monitoring security sensors.

The slot management module 242 is a software module for administrating data accumulation and communicating with external slot information system 62.

The denomination manager 244 is a software module for establishing denomination setting of the gaming machine 10. The denomination setting may include 1 cent, 2 cent, 5 cent, 25 cent, 1 dollar, 5 dollar and the like.

The data logger 246 is a software module for logging result of each primary game and the free game bonus to the game recall. In addition, the data logger 246 stores error events, bill log, cashout log, ticket log etc. to the accounting log.

The game recall file 256 is an accumulated data including results of each primary game and free game bonus. The game recall file 256 is stored in a non-volatile memory.

The accounting logs 258 is an accumulated data including error events, bill log, cashout log, ticket log etc. The accounting logs 258 are stored in a non-volatile memory.

The communications manager 248 is a software module for administrating communication between game application program 200 and system application program 206. The communications manager 248 also administrates network communication between system application program 206 and external network such as slot management system network, G2S network, gaming server for server based gaming network or VLT system network.

The bill acceptor manager 250 is a software module for administrating the bill acceptor and receives bill information inserted in the bill acceptor. In response to receiving the information from the bill acceptor, the bill acceptor manager 250 communicates with the metering for incrementing credit balance based on the inserted bill.

The metering module 252 is a software module for adjusting values of the meters 260 in response to communication with the game application program 200 via communications manager 248, the bill acceptor manager 250 or the cashout manager 254. The meters 260 includes a credit meter for indicating current credit balance on the gaming machine and a win meter for indicating win amount of current game session. The meters further include back ground meters such as coin-in, coin-out, total drop, attendant paid jackpots and/or bill-in. These meters might be implemented as data on the non-volatile memory or hardware meters.

The cashout manager 254 is a software module for administrating cashout procedure. In response to a player's operation on the cashout button, the cashout manager 254 is activated and the gaming machine pay total amount of the credit meter.

Figure 9:
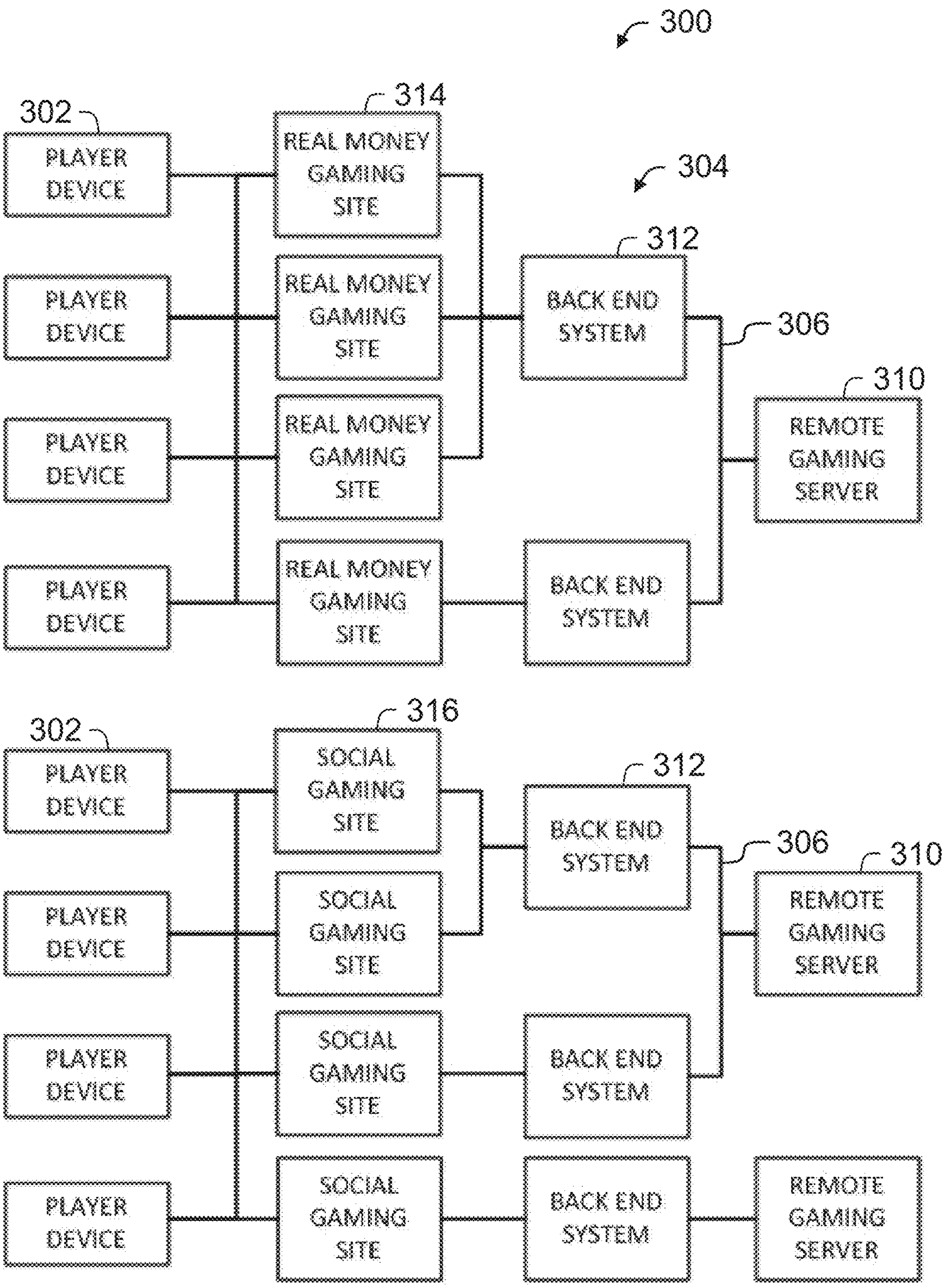
FIG. 9 is a functional block diagram of a server computer system, according to an embodiment of the present invention.
Figure 10:
FIG. 10 is a front view of a mobile computing device that may be used with the server computer system of FIG. 9.

Referring to FIGS. 9 and 10, in one embodiment, the present invention includes a networked server computer system 300 that is configured to deliver the game to one or more client computing devices 302 over the Internet. In the illustrated embodiment, the networked computer system 300 includes an iGaming server system 304 that is coupled in communication with one or more client computing devices 302 via a communications network 306. The communications network 306 may be any suitable connection, including the Internet, an Intranet, LAN, a virtual private network (VPN), cellular networks, etc . . . , and may utilize any suitable or combination of technologies including, but not limited to wired and wireless connections, always on connections, connections made periodically, and connections made as needed.

The client computing device 302 may include any suitable device that enables a user to access and communicate with the server system 300 including sending and/or receiving information to and from the server system 300 and displaying information received from the server system 300 to a user. In the illustrated embodiment, the client computing device 302 includes a processor coupled to a memory device. The memory device stores various programs and data that are executed by the processor for operating the client computing device 302. The client computing device 302 also includes an input device configured to receive operational inputs from the user, and a display device configured to display a graphical user interface. The input device and display device enable a user to interact with the server system 300 via the client computing device 302. For example, in one embodiment, the client computing device 302 may include, but is not limited to, a desktop computer, a laptop or notebook computer, a tablet computer, smartphone/tablet computer hybrid, a personal data assistant, a handheld mobile device including a cellular telephone, and the like. In one embodiment, the processor of the client computing device 302 may be programmed to function as the control unit 22 of the gaming machine 10.

In the illustrated embodiment, the client computing device may include a web browser program stored in the memory device. The processor executes the web browser program to display web pages on the display device that includes information received from the server system 300 to enable a user to interact with and operate the server system 300.

In one embodiment, the client computing device 302 includes a mobile computing device 308 (shown in FIG. 10) such as, for example, a tablet computer, a smartphone/tablet computer hybrid, a smartphone such as an iPhone™, and the like. The mobile computing device 308 includes a processor coupled to a memory device for storing various programs and data for use in operating the mobile computing device 308. The mobile computing device 308 may also include a display unit 24 including a touchscreen, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device 308 may also include a Wi-Fi antenna, a cellular network antenna, a Bluetooth™ communications device, assisted GPS and GLONASS, a digital compass, and an iBeacon™ microlocation device.

The mobile computing device 308 may be programmed to store and execute mobile computer program applications that display graphical user interfaces on the touchscreen display unit 24 including display area 64 that allows the user to access the server system 300 to retrieve and store information within the server system 300 as well as interact with and operate the server system 300. In addition, in one embodiment, the server system 300 may install one or more mobile computer application programs in the memory device of the mobile computing device 308. When initiated by the processor of the mobile computing device 308, the mobile computer application program causes the processor of the mobile computing device 308 to perform some or all of the functions of the gaming machine 10.

In the illustrated embodiment, the server system 300 includes one or more remote gaming servers 310, one or more back-end servers 312, one or more real money gaming website hosting servers 314, and one or more social gaming website hosting servers 316. In the illustrated embodiment, the social gaming website hosting server 316 and the real money gaming website hosting server 314 are programmed to host a web site that is accessible by a user via one or more client computing devices 302. The website hosting servers 314 and 316 execute a website application program that retrieves application code from the back-end server 312 and executes the application code to render one or more webpages on a display device of a client computing device 302 in response to requests received from the user via the client computing device 302 to allow users to interact with the website. The website hosting servers 314 and 316 are configured to generate and display webpages displaying a game. For example, the real money gaming website hosting server 314 is configured to host a real money wagering web site that enables players to convert monetary funds to gaming credits that may be used to place wagers on the game. The social gaming website hosting server 316 is configure to host a social media and/or social gaming website that allows players to receive gaming credits for activities such as purchasing goods and/or services through an e-commerce website, and/or purchase gaming credits that may be used to play the game.

Each back-end server 312 is configured to perform operations to support the functions of the webpages and/or website being displayed by the website hosting servers 314 and 316. For example, in one embodiment, the back-end servers 312 may include a player account system server that is configured to generate player accounts that include data associated with a player including, but not limited to, player identification information, player financial account information, player gaming credit account information, and/or any suitable player information, that may be used to establish credit meters and allow players to place wagers on the game.

Each remote gaming server 310 includes one or more copies of the game application program 200 stored in a memory device of the remote gaming server 310. A processor of the remote gaming server 310 is programmed to retrieve and transmit the game application program 200 to one or more back-end servers 312 for use in displaying the game to the user via a webpage being displayed by the web browser program.

In one embodiment, the game application program 200 may include instructions for rendering the game and executing the game on the client computing device 302. For example, the game application program 200 may include instructions for generating rendered code, such as, for example HTML code, which may be used by the web browser program of the client computing device 302 for displaying the game. For example, the game application program 200 may include program software code including, but not limited to, HTML, JavaScript, cascade style sheets (CSS), and any suitable programming code that may be used for rendering and operating the game via a web site and/or mobile computer application.

In one embodiment, upon receiving a request from the website hosting servers 314, 316 via the back-end server 312, the remote gaming server 310 may execute the game application program 200 to operate the game, and execute a render-to-string operation to generate rendered code indicative of the game, such as, for example HTML, code, and transmit the rendered code to the back-end server 312. The back-end server 312 may then transmit the rendered code to the corresponding website hosting servers 314, 316 for use in displaying the game on the website. As the player plays the game, the remote gaming server 310 may execute the game application program 200 for each instance of the game, and transit rendered code to the back-end servers 312.

In another embodiment, the remote gaming server 310 may transmit the game application program 200 to the back-end server 312 and/or the website hosting servers 314, 316. The back-end server 312 and/or the website hosting servers 314, 316 may then execute the game application program 200 to initiate the instances of the game and execute render-to-string operations to generate rendered code indicative of the game.

In yet another embodiment, the back-end server 312 may receive a request to initiate the game from a mobile computing device 308 executing the mobile computer application program. Upon receiving the request, the back-end server 312 may access the game application program 200 and execute a render-to-string operation to generate rendered code indicative of the game and transmit the rendered code to the mobile computing device 308. In one embodiment, the back-end server 312 may continuously execute the game application program 200 to generated each instance of the game using a random number generator of the back-end server 312 based on input received from the mobile computing device 308 and generate and transmit rendered code for each instance of the game to the mobile computing device 308. In another embodiment, the back-end server 312 may execute a partial-render operation and generate partially-rendered code of the game using the game application program 200, and transmit the partially rendered code of the game and object data of game assets to the mobile computing device 308. The partially rendered code includes instructions for generating rendered code using the game assets and a random number generator of the mobile computing device for generating and displaying the game on the mobile computing device 308 using the mobile computer application program.

In one embodiment, the game application program 200 may be stored on several different servers. The game code on these servers is used to distribute game content to social or real money gaming websites and mobile applications. The distribution method is very flexible. For example, the game code and/or game application program 200 including game code and game object assets may be stored on a remote gaming server 310. One remote gaming server 310 may be connected to one or more back-end server 312.

Each back-end server 312 is configured to distribute the games to one or more websites or mobile applications. Players connect to these websites/mobile applications with the client devices or mobile devices and have access to the game content. A copy of game application program 200 including game code and game object assets is stored on the remote gaming server 310 for each back-end server 312 that is connected to the remote gaming server 310 and that distributes the game. For example, if one remote gaming server 310 is connected to two back-end servers 312, which is connected to three website hosting servers 314, 316 that distribute the game, the remote gaming server 310 would store two copies of the game application program 200 including game code and game object assets for the game (e.g., one copy for each back-end server 312).

For example, the server system 300 may be configured to implement the game on a mobile application such as, for example, "my KONAMI Slots™" mobile application available in Apple iOS™, Google Android™, and Amazon Kindle™ operating platforms, or on social-media websites such as the "my KONAMI Slots™" available on Facebook™. In one embodiment, the mobile application may download the game code from remote gaming server 310 via the real money gaming site 314 or the social gaming site 316 and execute the game code on the client computing device 302. In this embodiment, the game code may provide game specific/front-end function when executed by the processor of the client computing device, and the back end system 312 may provide generic/back-end function.

FIGS. 11-14 are flow charts of methods 400, 500, 600, and 700 illustrating the algorithms included in the game application program 200 and performed by the processor 38 when executing the game application program 200 for operating the gaming machine 10 and/or iGaming server system 304 to implement the game. The methods include a plurality of steps. Each method step may be performed independently of, or in combination with, other method steps. Portions of the methods may be performed by any one of, or any combination of, the components of the gaming machine 10 and/or iGaming server system 304. FIGS. 31A-32C are diagrammatic illustrations of the game being displayed on the display area of the gaming machine in FIGS. 3A-3B and the mobile computer device shown in FIG. 10, according to an embodiment of the present invention. FIGS. 15-30 are exemplary illustrations of computer program data files that may be used by processor 38 when executing the game application program 200.

In the illustrated embodiment, the game execution program 200 includes computer instructions for generating the primary game 68 that includes a plurality of virtual reels 72-80, and the bonus feature event 70 that includes a plurality of independent unisymbol reels 152. In general, the bonus feature event 70 is executed when a triggering event is detected during the primary game 68. The bonus feature event 70 provides credit awards to the player based on the appearance of a special symbol 120 appearing in one of the cells 84. In one embodiment, the primary game 68 includes a reel-type game that includes a plurality of virtual reels that spin and stop to display the outcomes of the primary game. In other embodiments, the primary game 68 may include a playing card game, a bingo game, a Keno game, and/or any suitable casino type wagering game.

In the illustrated embodiment, the control unit 22 is programmed to execute the algorithm illustrated in methods 400, 500, 600, and 700 for executing the game and displaying the game on the display unit 24. In method step 402, the processor 38 of the control unit 22 generates the virtual reels 72-80 for use with an instance of the primary game 68, and displays the virtual reels 72-80 in the grid 82.

In method step 402, the processor 38 receives a signal to initiate an instance of the game 68 and generates the virtual reels 72-80 for use during the instance of the game 68. For example, the processor 38 may receive a signal from the display unit 24 and/or the operation unit 32 indicating a player's request to initiate an instance or play of the game 68. In one embodiment, the player may transmit a request to initiate an instance or play of game 68 by depressing a corresponding "spin" button on the operation unit 32 by touching a corresponding button icon being displayed on a touchscreen of the display unit 24. Upon receiving a signal from the display unit 24 and/or the operation unit 32, the processor 38 initiates the instance of the game 68 by generating the virtual reels 72-80 for use in the primary game 68.

In the illustrated embodiment, the processor 38 executes the algorithm illustrated in method 500 to generate the virtual reels 72-80. In method step 502, the processor 38 retrieves the reel strip data file 90 and symbol image data files 92, 94, and 96 for use in generating the virtual reels 72-80. The processor 38 accesses each logic cell 100 to retrieve indicators for generating each virtual reel 72-80 to include a plurality of fixed symbol positions 116, a plurality of variable symbol positions 122, and a plurality of credit prize symbol positions 136, and to populate the corresponding symbol positions with game symbols 86. For example, the processor 38 retrieves the indicators for each fixed symbol positions 116 and selects the correspond predefined game symbol 86 game symbol image data file 92 and populates each fixed symbol position 116 with the corresponding predefined game symbol 86.

In method step 504, the processor 38 randomly selects a first game symbol for populating the variable symbol positions 122. For example, in one embodiment, the processor 38 accesses the variable symbol reel strip data file 124, randomly selects a symbol position 112 using a random number and reel stop position data file 174. In this example, the processor 38 retrieves a random number from the random number generator, accesses the reel stop position data file 174 and identifies the random number range that includes the retrieved random number, and determines the reel stop position associated with the identified random number range. The processor 38 then accesses the variable symbol reel strip data file 124 and selects the game symbol 86 associated with the determined reel stop position. In another embodiment, the processor 38 may accesses the variable symbol weight table 126, and randomly select a game symbol 86 based on the plurality of selection weights associated with each game symbol 86 and the retrieved random number.

In method step 506, the processor 38 determines if the randomly selected first game symbol is the special symbol 120.

In method step 508, if the special symbol 120 is not selected, the processor 38 populates each variable symbol position 122 included in each virtual reel strip 102-110 with the randomly selected first game symbol, and proceeds to method step 518.

If the special symbol 120 is selected, the processor 38 executes method step 510 and randomly selects a virtual reel strip from the plurality of virtual reel strips 102, 104, 106, 108, 110.

In method step 512, the processor 38 populates each variable symbol position 122 included in the selected virtual reel strip with the special symbol 120.

In method step 514, the processor 38 randomly selects a second game symbol for populating the remaining variable symbol positions 122 included in the remaining virtual reel strips. The second game symbol is selected from a group of game symbols that does not include the special symbol 120. For example, in one embodiment, the processor 38 may access the variable symbol weight table 126 and use the second set 134 of selection weights 130 that is associated with a second predefined group of symbols that does not include the special symbol 120. In another embodiment, the processor 38 may also variable symbol reel strip data file 124 and continue to randomly select symbol positions until a symbol position that does not have a special symbol is selected, or use a modified variable symbol reel strip data file that does not include special symbols.

In method step 516, upon randomly selecting the second game symbol, the processor 38 populates each variable symbol position 122 of each remaining virtual reel strip with the randomly selected second game symbol.

In method step 518, the processor 38 randomly selects a credit prize symbol 138 for each credit prize symbol position 136 included in each virtual reel strip 102-110 and populates each of the credit prize symbol positions 136 with a randomly selected credit prize symbol 138. In the illustrated embodiment, the processor 38 performs a random selection for each credit prize symbol position 136. In other embodiments, the processor 38 may randomly select a credit prize symbol 138 to populate in one or more credit prize symbol positions 136.

In the illustrated embodiment, the processor 38 uses the credit prize symbol weight tables 140 and 142 to select each credit prize symbol 138 using random numbers. For example, for each credit prize symbol positions 136, the processor 38 retrieves a random number from the random number generator, selects a credit prize symbol 138 from the credit prize symbol weight tables 140 and 142 using the random number, and populates the corresponding credit prize symbol position 136 with a symbol image from the credit prize symbol image data files 94 and 96 that is associated with the selected credit prize symbol 138.

In one embodiment, the processor 38 receives a signal indicating a wager amount being placed by the player, and selects the minimum bet value credit prize symbol weight table 140 or the maximum bet value credit prize symbol weight table 142 based on the amount of the wager. For example, upon determining the wager amount is less than a predefined wager amount, the processor 38 may select the credit prize symbols using the minimum bet value credit prize symbol weight table 140 that includes a group of credit prize symbols including a plurality of locked credit prize symbols 148 and a plurality of unlocked credit prize symbols 150 that include active credit prize symbols 144 and inactive credit prize symbols 146. In addition, upon determining the wager amount is larger than the predefined wager amount and/or includes a maximum wager amount, the processor 38 may select the credit prize symbols using the maximum bet value credit prize symbol weight table 142 that does not include locked credit prize symbols 148.

In method step 520, the processor 38 renders the virtual reels 72-80 on the game screen 64 based on the populated virtual reel strips 102-110 and returns to method step 404.

Figure 11:
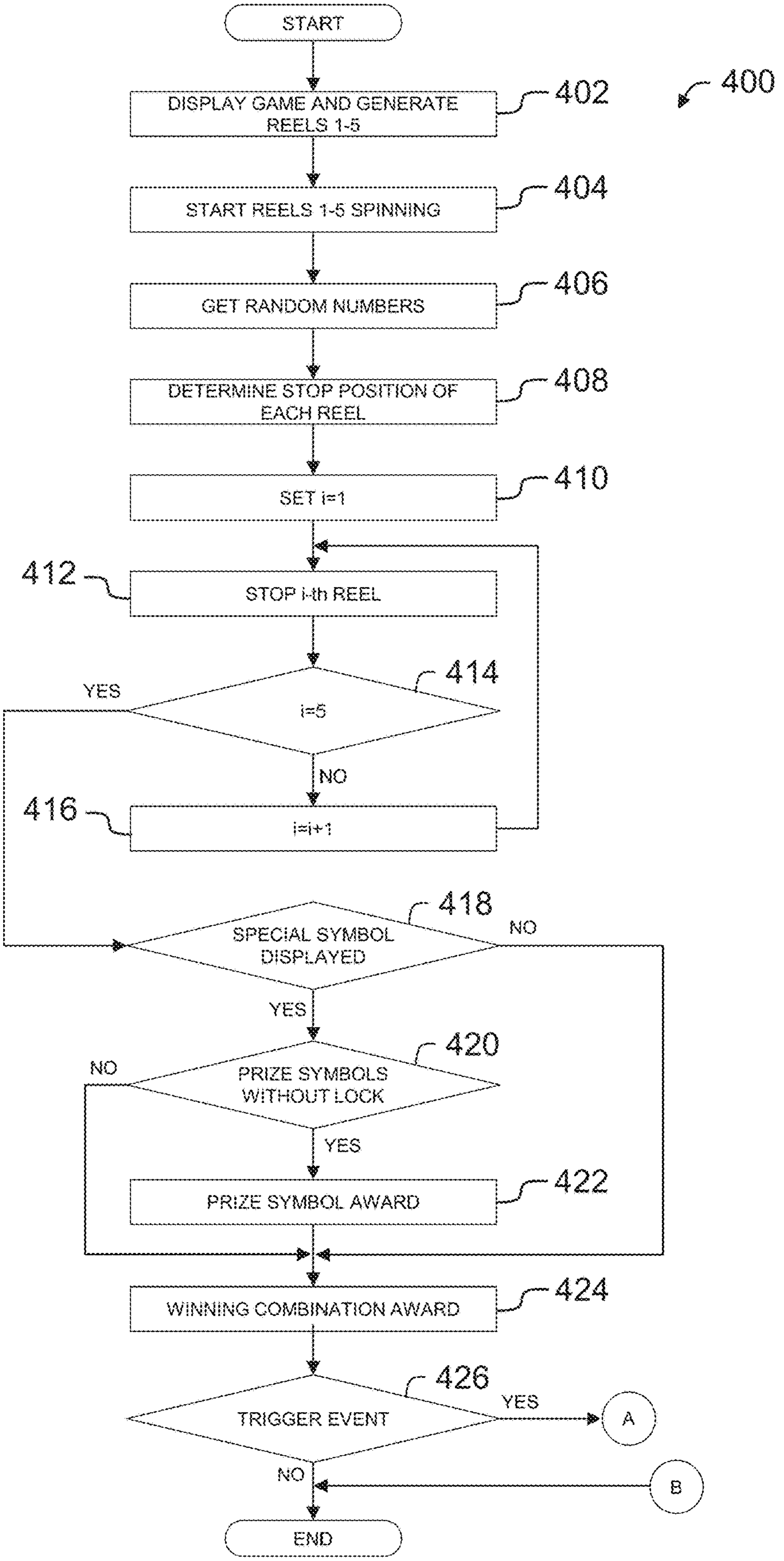
FIGS. 11-14 are flow charts illustrating the algorithms used during operation of the gaming machine and/or the mobile computing device to execute the game shown in FIGS. 3A-3B, according to one embodiment of the present invention.
Figure 12:
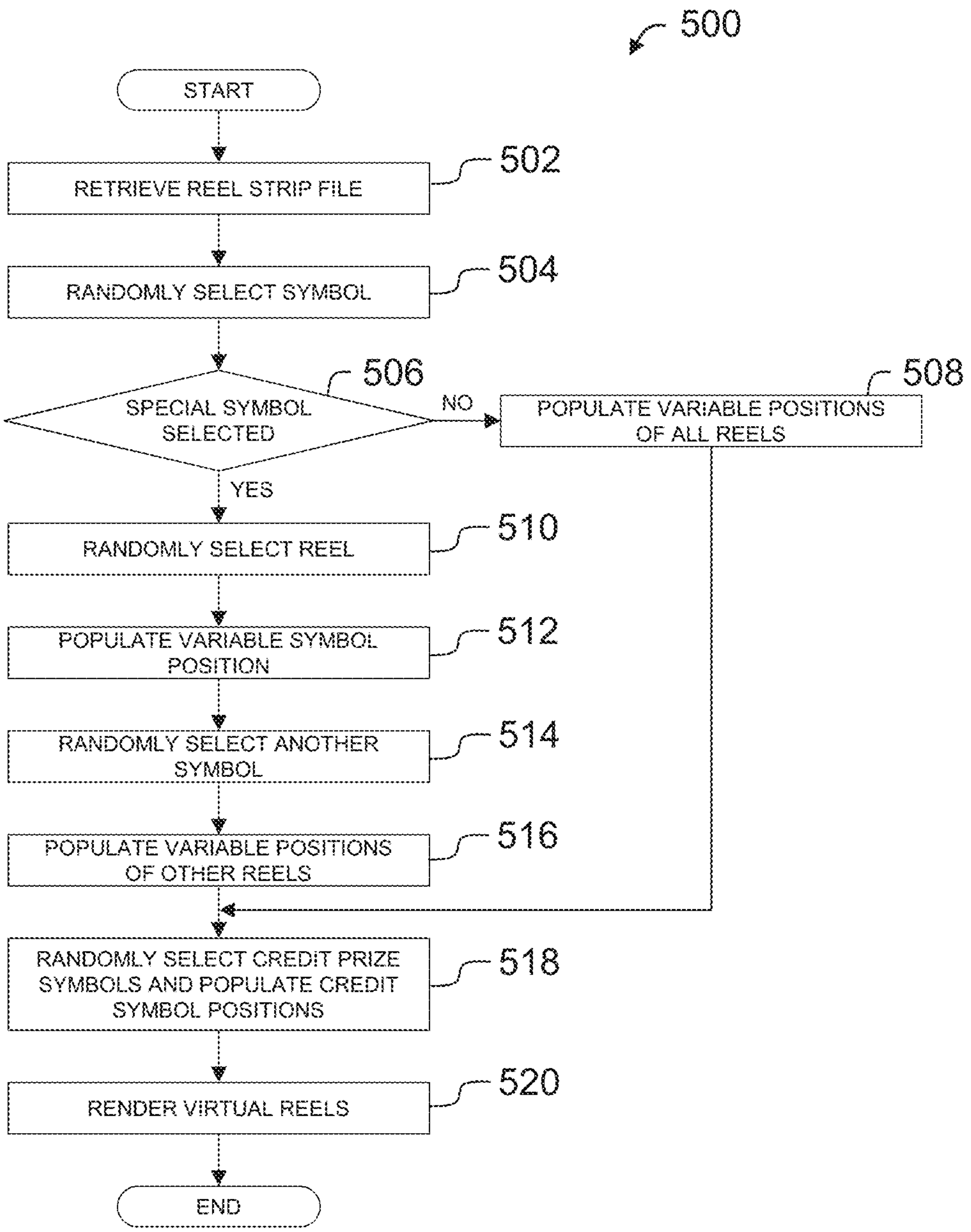
Figure 31A:
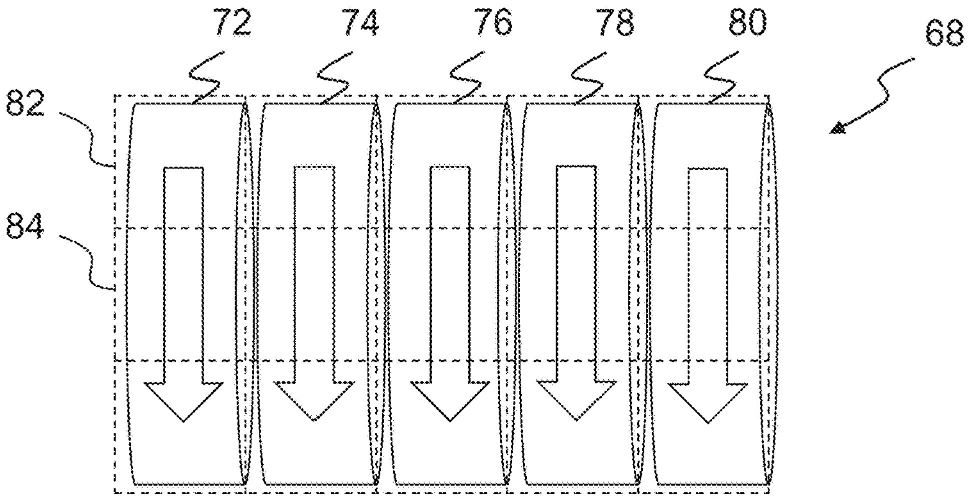
FIGS. 31A-32C are diagrammatic illustrations of sequences of graphic images that may be used to display the game shown in FIGS. 3A-3B on the display area of the gaming machine in FIGS. 1A-1B and the mobile computer device shown in FIG. 10, according to an embodiment of the present invention.
Figure 31B:
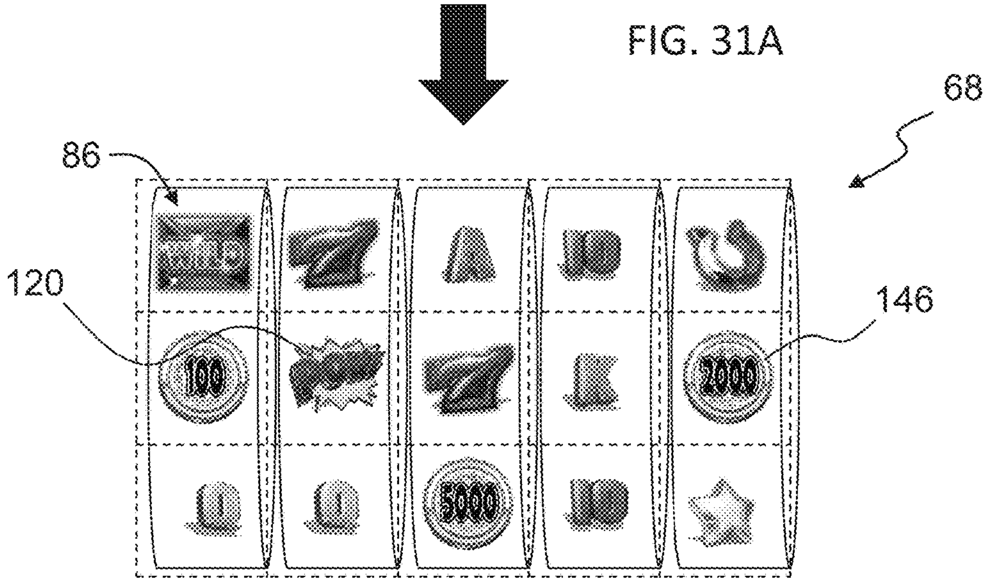
Figure 31C:
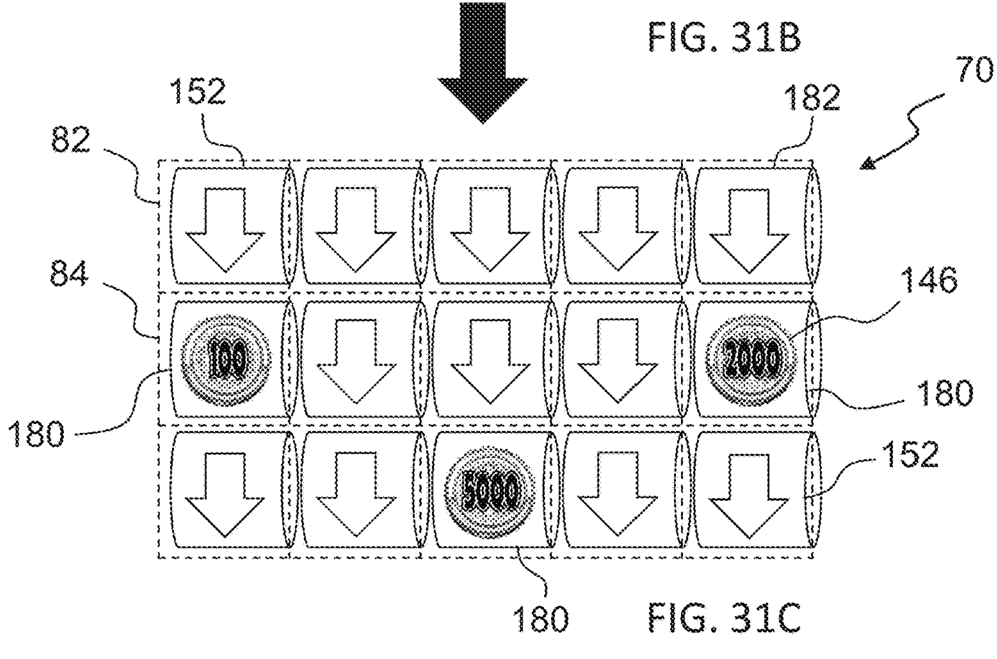

Referring to FIG. 11, in method steps 404-416, the processor 38 randomly determines an outcome of an instance of the primary game 68 and spins the virtual reels 72 to 80 (as shown in FIGS. 31A-31B) and sequentially stops the virtual reels 72 to 80 to display the randomly generated outcome including a game symbol being displayed in each cell 84 of the grid 82. For example, in one embodiment, the processor 38 starts spinning each virtual reel 72 to 80, obtains random numbers from the random number generator, and determines a stop position of each virtual reel 72 to 80 based on the random numbers and the reel stop position data file 174. In the illustrated embodiment the reel stop position data file 174 includes a range of random numbers associated with each symbol position in the sequence of symbol positions associated with the virtual reel. In one embodiment, the processor may obtain a random number for each simulate virtual reel 72 to 80, i.e., five random numbers. The processor 38 then establishes a reel stop counter, "i", and sets the reel stop counter, i, equal to 1. The processor 38 then identifies the ith virtual reel strip associated with the stop counter, i, and stops the identified virtual reel strip to display the corresponding symbols in the corresponding cells 84 associated with the identified virtual reel strip. The processor 38 then increments the reel stop counter, i, by 1, i.e., i=i+1, and repeats the process of identifying the virtual reel strip associated with the incremented reel stop counter and stopping the identified virtual reel. This process continues until each virtual reel has been stopped. In this embodiment, for example, the virtual reels are numbered 1-5. In one embodiment, during the reel spin, the player may initiate the stopping of the reels by depressing the spin button, which enables the player to accelerate game play.

In method step 418, upon stopping the virtual reels 72 to 80, the processor 38 determines if the special symbol 120 is being displayed in the outcome of the primary game 68 with the reels stopped. If the processor 38 does not detect the appearance of the special symbol 120 in the outcome, the processor 38 proceeds to execute method step 420. If the processor 38 detects the appearance of the special symbol 120 in the outcome of the game, the processor 38 executes method step 424 and identifies credit prize symbols 138 appearing in the outcome. In addition, the processor 38 may identify credit prize symbols 138 appearing in the outcome that are not locked credit prize symbols 148. In method step 420, the processor 38 determines a credit prize amount based on the credit prize symbols 138 appearing in the outcome of the primary game 68 and provides the determined credit prize amount to a player. In the illustrated embodiment, the processor 38 determines the credit prize amount based on the credit prize symbols 138 appearing in the outcome that are not locked credit prize symbols 148. For example, the processor 38 is programmed to determine the credit prize amount based on a credit value associated with each unlocked credit prize symbol appearing in the game outcome.

In method step 424, the processor 38 determines whether any winning combination of symbols is displayed in the outcome of the instance of the primary game 68, and determines an additional credit award based on the game symbols displayed in the outcome and the paytable data file 178 including a list of winning combination of game symbols and associated credit awards.

In method step 426, the processor 38 determines whether a trigger condition has been detected in the outcome of the primary game 68. If a trigger condition is detected during the primary game 68, the processor 38 initiates the bonus feature event 70 by executing the algorithm illustrated in method 600 (shown in FIG. 13). In the illustrated embodiment, the trigger condition includes a plurality of credit prize symbols 138 appearing in the outcome of the game 68 (shown in FIG. 31B).

Figure 13:
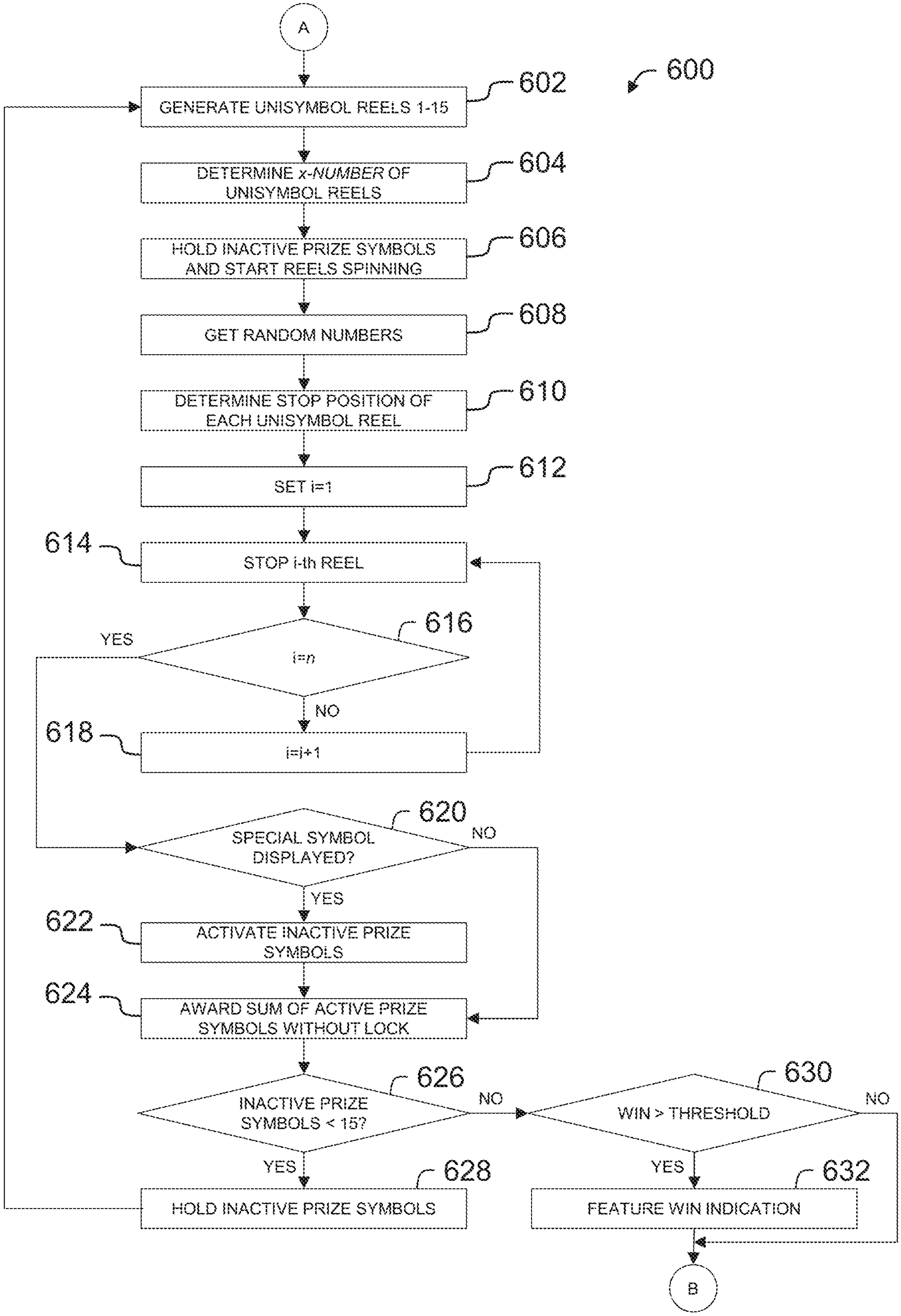
Figure 14:
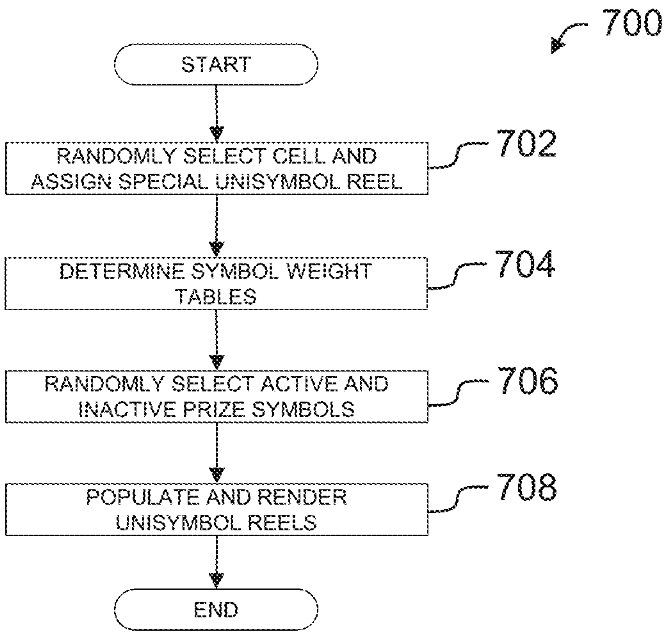

Referring to FIG. 13, in the illustrated embodiment, in method step 602, the processor 38 generates a plurality of independent unisymbol reels 152 for use during the bonus feature event 70 and transitions the game screen 64 from displaying the virtual reels 72-80 in the grid 82 to displaying an independent unisymbol reel 152 in each cell 84 of the grid 82.

In one embodiment, the processor 38 executes the algorithm illustrated in method 700 (shown in FIG. 14) to generate the independent unisymbol reels 152. In method step 702, the processor 38 accesses the unisymbol reel strip data file 154 (shown in FIG. 23), randomly selects one of the cells 84 included in the grid 82, and associates the special unisymbol reel strip 166 with the randomly selected cell 84. The special unisymbol reel strip 166 includes a group of bonus credit prize symbols and the special symbol 120. The processor 38 then associates the primary unisymbol reel strip 164 with each remaining cell 84 in the grid 82, e.g. each non-selected cell 84 is assigned the primary unisymbol reel strip 164. In one embodiment, the processor 38 selects the cell 84 from a group of cells 84 that includes each cell 84 included in the grid 82. In other embodiments, the processor 38 identifies cells 84 that currently display inactive prize symbols 146 and excludes those cells from the group of cells 84 used to display the special unisymbol reel strip 166. In other embodiments, the processor 38 may be programmed to randomly select a cell from the grid 82, determine whether the selected cell currently displays an inactive prize symbol 146, and randomly select another cell if the previously selected cell currently displays an inactive prize symbol 146. This process may continue until a cell 84 not currently displaying an inactive prize symbol 146 is selected.

In method step 704, the processor 38 determines the bonus feature prize symbol weight tables 156, 158, 160, 162 to be used to randomly select the active prize symbols 144, inactive prize symbols 146, and locked prize symbols 148 to populate the symbol positions of the special unisymbol reel 166 and the primary unisymbol reels used during the bonus feature event 70. For example, in one embodiment, the processor 38 is programmed to access the primary unisymbol reel weight tables 156 and 160 for use in randomly selecting the credit prize symbols populating the primary unisymbol reels 164, and access the special unisymbol reel weight tables 158 and 162 for use in randomly selecting the credit prize symbols populating the special unisymbol reel 166. In one embodiment, the processor 38 may determine a bet level associated with the primary game 68 such as, for example, a bet denomination and/or an amount of a wager placed by the player on the primary game 68, and select the primary unisymbol reel weight tables 156 and 160 and the special unisymbol reel weight tables 158 and 162 based on the determined bet level. For example, the processor 38 may be programmed to use a primary minimum bet value symbol weight table 156 to populate the primary unisymbol reel strip 164 and a special minimum bet value symbol weight table 158 to populate the special unisymbol reel strip 166, upon determining that a player has placed a minimum wager value and/or placed a bet having a wager value that is less than a maximum bet value. The processor 38 may also be programmed to use a primary maximum bet value symbol weight table 160 to populate the primary unisymbol reel strip 164 and a special maximum bet value symbol weight table 162 to populate the special unisymbol reel strip 166, upon determining that the player has placed a maximum wager value on an instance of game or placed a predefined maximum bet amount.

In method step 706, the processor 38 accesses each logic cell 100 in the special unisymbol reel strip 166 to retrieve indicators for generating the special unisymbol reel strip 166 and randomly selects credit prize symbols 138 based on the indicators associated with each logic cell 100 and the selected special unisymbol reel weight tables 158 and 162. For example, for each active prize symbol position 168 included in the special unisymbol reel strip 166, the processor 38 randomly selects a credit prize symbol from the group of active prize symbols 144 included in the selected special unisymbol reel weight tables 158 and 162, and for each inactive prize symbol position 170 included in the special unisymbol reel strip 166, the processor 38 randomly selects a credit prize symbol from the group of inactive prize symbols 146 included in the selected special unisymbol reel weight tables 158 and 162. In addition, the processor 38 populates the special symbol position 172 with the special symbol 120.

Similarly, the processor 38 accesses each logic cell 100 in the primary unisymbol reel strip 164 to retrieve indicators for generating each primary unisymbol reel. The processor 38 randomly selects credit prize symbols 138 based on the indicators associated with each logic cell 100 and the selected primary unisymbol reel weight tables 156 and 160. For example, for each active prize symbol position 168 included in the primary unisymbol reel strip 164, the processor 38 randomly selects a credit prize symbol from the group of active prize symbols 144 included in the selected primary unisymbol reel weight tables 156 and 160, and for each inactive prize symbol position 170 included in the primary unisymbol reel strip 164, the processor 38 randomly selects a credit prize symbol from the group of inactive prize symbols 146 included in the selected primary unisymbol reel weight tables 156 and 160.

In method step 708, the processor 38 renders and displays the plurality of independent unisymbol reels 152 in the grid 82 by transitioning the game screen 64 from displaying the virtual reels 72-80 to display the plurality of independent unisymbol reels 152 (as shown in FIGS. 31C-32C).

In method steps 604-618, the processor 38 randomly determines an outcome of an instance of the bonus feature event 70 and spins the independent unisymbol reels 152 and sequentially stops the independent unisymbol reels 152 to display the randomly generated outcome. In one embodiment, the processor 38 determines a number, n, of independent unisymbol reels 152 that will be spun during the instance of the bonus feature event 70, and determines a sequential stopping order of the unlocked unisymbol reels. For example, prior to spinning the independent unisymbol reels 152, the processor 38 detects the appearance of inactive prize symbols on a cell 84 of the game screen prior to a spin, and "locks" the inactive prize symbol 146, illustrated as a locked independent unisymbol reel 180. The processor 38 then determines the n-number of independent unisymbol reels 152 that are not displaying an inactive prize symbol, illustrated as unlocked independent unisymbol reel 182 with a downward direction arrow to illustrate the spinning reel, and establishes a sequential stopping order of the unlocked independent unisymbol reel 182.

The processor 38 initiates a spin of the unlocked independent unisymbol reels 152 with each locked independent unisymbol reel 180 displaying an inactive prize symbol being held or "locked" in place, such that each locked independent unisymbol reel 180 is not spinning. The processor 38 obtains random numbers from the random number generator, and determines a stop position of each independent unisymbol reels 152 based on the random numbers and the reel stop position data file 174. In one embodiment, the processor 38 obtains a random number for each independent unisymbol reel 152. In another embodiment, the processor 38 only obtains a random number for each unlocked independent unisymbol reel 182. The processor 38 then establishes a reel stop counter, "i", and sets the reel stop counter, i, equal to 1. The processor 38 then identifies the ith independent unisymbol reel associated with the stop counter, i, and stops the identified independent unisymbol reel 152 to display the corresponding symbols in the corresponding cells 84 associated with the identified independent unisymbol reel. The processor 38 then increments the reel stop counter, i, by 1, i.e., i=i+1, and repeats the process of identifying the independent unisymbol reel associated with the incremented reel stop counter and stopping the identified independent unisymbol reel. This process continues until n-number of independent unisymbol reels has been stopped. In one embodiment, during the reel spin, the player may initiate the stopping of the reels by depressing the spin button, which enables the player to accelerate game play. In one embodiment, the processor 38 initiates an extended spin of the special unisymbol reel during the display of the bonus feature event outcome.

Figure 32A:
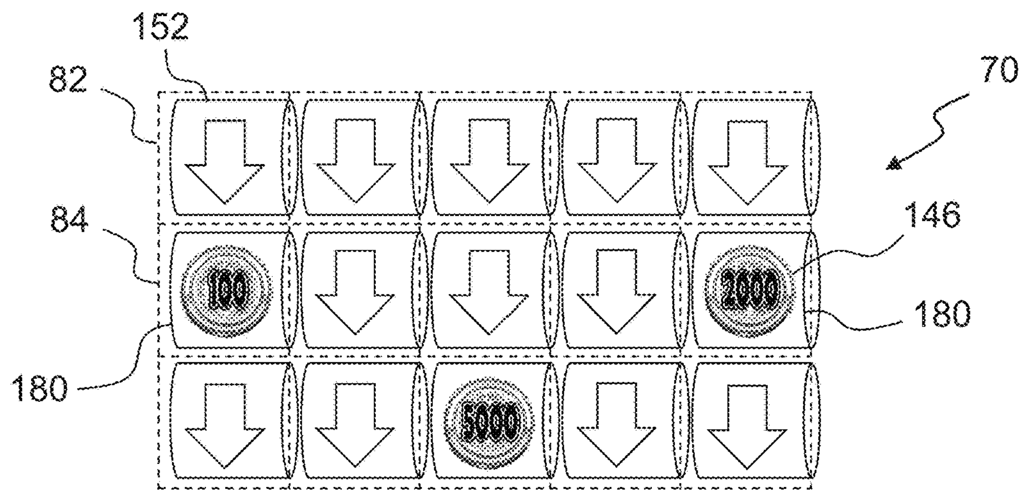
Figure 32B:
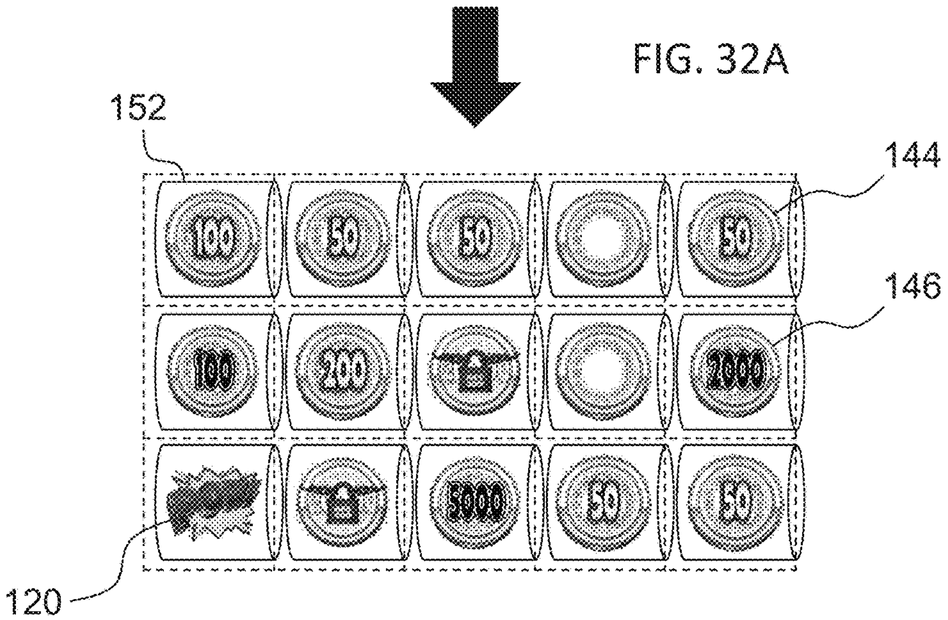
Figure 32C:
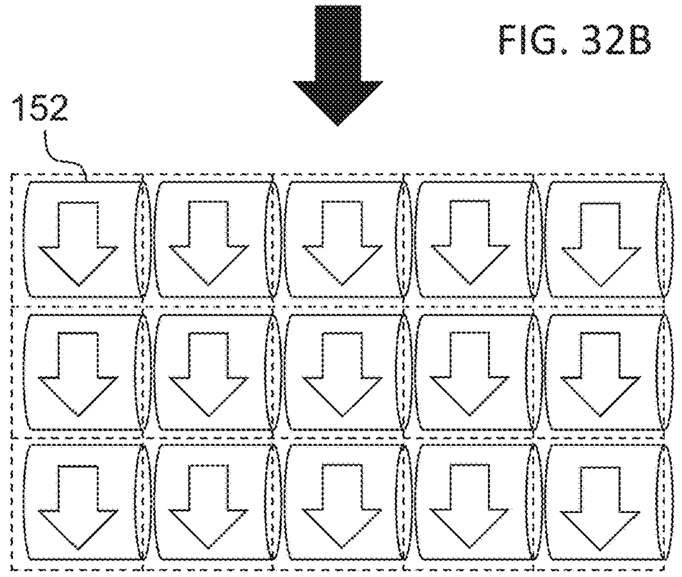

In method step 620, the processor 38 detects the appearance of the special symbol 120 being displayed in the bonus feature outcome with reels stopped (shown in FIG. 32B). If the appearance of the special symbol 120 is not detected in the outcome, the processor 38 executes method step 624 and determines a credit prize award based on a credit value associated with each active prize symbol being displayed in the bonus feature event outcome.

If the processor 38 detects the appearance of the special symbol 120, the processor 38 executes method step 622 and "activates" each displayed inactive prize symbol 146 and provides a credit award based on a credit value of each inactive prize symbol appearing in the bonus feature event outcome. The processor 38 also executes method step 624 to provide the credit prize award based on the active prize symbols 144 displayed in the bonus feature event outcome.

In method step 626, the processor 38 determines if the bonus feature event outcome includes an inactive credit prize symbol 146 being displayed in each cell 84 with the independent unisymbol reels 152 in a stopped position. If the number of inactive credit prize symbol 146 being displayed in the outcome is less than the number of cells 84 on the grid 82, (e.g. one or more independent unisymbol reels 152 does not display an inactive credit symbol), the processor 38 executes method step 628 and locks the reels displaying the inactive credit prize symbol 146 to hold the symbols in position, and proceeds to initiate another instance of the bonus feature event 70. In the illustrated embodiment, the processor 38 is programmed to return to method step 602 and generate new independent unisymbol reels 152 using method 700. In another embodiment, the processor 38 returns to method step 604 to initiate another spin of the currently displayed unisymbol reels.

In method step 626, the processor 38 terminates the bonus feature event upon detecting an appearance of an inactive prize symbol 146 in each cell 84 with the unisymbol reels stopped and transitions the game screen 64 back to the primary game 68 including replacing the plurality of independent unisymbol reels with virtual reels 72-80. The processor 38 may also execute method steps 630 and 632 to determine whether the credit award is greater than a threshold amount and displays a feature win indication on the game screen if the credit award is greater than a threshold amount.

In the illustrated embodiment, the processor 38 is programmed to generate and display a game that includes a primary game including a plurality of multi-symbol virtual reels and a bonus feature event that including a plurality of independent unisymbol reels. The primary game is a minimum 50 bet, 5-reel game that incorporates a feature event. The minimum bet is 50 credits. All wins pay from the left most position to the right on adjacent positions except PRIZE. Highest win only for each combination. All wins are multiplied by the bet level. All wins are added. All wins are shown in credits. Total credits wagered is the bet level multiplied by 50 credits, plus additional credits wagered at max bet.

Each reel contains a number of positions that are randomly replaced with one of the following symbols: POW, SEVEN, CLOVER, HORSESHOE, STAR, A, K, Q, J, 10 and 9, before the reel spin is initiated. POW can only appear on one randomly selected reel. When POW is selected, all positions on the randomly selected reel are filled with POW. All positions on remaining reels are filled with the same symbol from the following symbols: SEVEN, CLOVER, HORSESHOE, STAR, A, K, Q, J, 10 and 9. WILD appears on reels 2, 3 and 4 only. WILD substitutes for SEVEN, CLOVER, HORSESHOE, STAR, A, K, Q, J, 10 and 9.

During the primary game, all credit prizes on screen without LOCK are awarded whenever POW lands on the screen. The possible values are 100, 500 and 1000 credits multiplied by the bet level. Values shown have been multiplied by the bet level. The following values are also available at max bet: 5000, 10000 and 20000. These values are not multiplied by the bet level and are displayed with LOCK when betting less than max bet.

Any 3, 4 or 5 PRIZE or LOCKED PRIZE trigger the bonus game. Each PRIZE and LOCKED PRIZE from the triggering screen is held in place and the respective positions are locked unless POW appears on the triggering screen. If POW appears on the triggering screen, no positions will be locked. The reel window converts to 15 independent reels. Each reel that is not in a locked position spins to display PRIZE or POW. Any reel that is in a locked position is held and will not spin. If ACTIVE 50, ACTIVE 100, ACTIVE 200, ACTIVE 250, ACTIVE 400, ACTIVE 500, and ACTIVE 800 is displayed at the end of a spin, the value is awarded to the player. ACTIVE 50, ACTIVE 250 and ACTIVE 400 are only available for a bet multiplier of 1. ACTIVE 200, ACTIVE 500 and ACTIVE 800 are only available for a bet multiplier of 2.

If INACTIVE BLANK, INACTIVE 100, INACTIVE 200, INACTIVE 500, INACTIVE 1000, INACTIVE 2000, 5000, 10000, and 20000 is displayed at the end of a spin, it is held in place and the position is locked. INACTIVE 100 and INACTIVE 500 are only available for a bet multiplier of 1. INACTIVE 200 and INACTIVE 2000 are only available for a bet multiplier of 2. 5000, 10000 and 20000 are displayed as LOCKED 5000, LOCKED 10000 and LOCKED 20000 when betting less than 200 credits. If POW is displayed at the end of a spin, all credit prizes on screen without LOCK are awarded and any locked positions are unlocked for the next spin. All wins are paid after positions have been unlocked. The feature ends when all positions are filled with INACTIVE BLANK, INACTIVE 100, INACTIVE 200, INACTIVE 500, INACTIVE 1000, INACTIVE 2000, 5000, 10000, 20000, LOCKED 5000, LOCKED 10000 or LOCKED 20000.

Further, in the embodiment, a bill/ticket is displayed as game value, and received by these bill/ticket identification devices, and a form where a ticket is output by a printer device is described, but the present invention is not limited to this. The game value is a concept including tangible objects such as a coin, bill, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment when showing a free game provided as a bonus game, a bonus game that uses a different virtual reel strips from a regular game may be provided. Further, there could be a provided a feature game according to a value of the random number acquired during a regular game.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine for displaying a computer-animated reel game, comprising:

a cabinet;

a display device mounted to the cabinet and including a graphical user interface (GUI) display screen displaying computer-generated images thereon; and a control unit operably coupled to the display device, the control unit including:

a random number generator;

a memory device storing:

bonus feature prize symbol weight tables including computer-executable instructions defining a primary unisymbol reel weight table including a plurality of first credit prize symbols having corresponding selection weights and a special unisymbol reel weight table including a plurality of second credit prize symbols having corresponding selection weights;

credit prize symbol image data files including computer-executable instructions for generating computer images of game symbols populating symbol positions; and a unisymbol reel strip data file including computer-executable instructions defining a primary unisymbol reel strip and a special unisymbol reel strip, the primary unisymbol reel strip and the special unisymbol reel strip each include a plurality of sequential symbol position logic cells that includes indicators for rendering unisymbol reels with a plurality of symbols, each sequential symbol position logic cell is associated with a symbol position configured to be populated by credit prize symbols that are selected from the credit prize symbol image data files using the bonus feature prize symbol weight tables, the plurality of sequential symbol position logic cells include a plurality of active prize symbol positions configured to be populated with active prize symbols and a plurality of inactive prize symbol positions configured to be populated with inactive prize symbols; and one or more processors programmed to execute an algorithm to display an animated sequence of computer-generated images of the computer-animated reel game on the display device GUI including the steps of:

rendering a game screen on the display device GUI including a grid having a plurality of cells arranged in a plurality of rows and columns having a 3×5 cell arrangement;

animating a plurality of virtual reels to appear in the grid with each virtual reel being displayed in a corresponding column, each of the plurality of virtual reels including a plurality of credit prize symbols;

spinning and stopping each of the plurality of virtual reels to display an outcome of the computer-animated reel game; and replacing the plurality of virtual reels with a plurality of unisymbol reels by:

accessing the unisymbol reel strip data file stored in the memory device and generating the primary unisymbol reel strip including a plurality of first symbol positions and the special unisymbol reel strip including a plurality of second symbol positions and a special symbol position, the special unisymbol reel strip including fewer symbol positions than the primary unisymbol reel strip;

generating a plurality of primary unisymbol reels using the primary unisymbol reel strip by:

accessing the primary unisymbol reel weight table stored in the memory device and randomly selecting first credit prize symbols from the primary unisymbol reel weight table using the random number generator; and populating the plurality of first symbol positions with the randomly selected credit prize symbols;

generating a special unisymbol reel using the special unisymbol reel strip by:

accessing the special unisymbol reel weight table stored in the memory device and randomly selecting second credit prize symbols from the special unisymbol reel weight tables using the random number generator;

populating the plurality of second symbol positions with the randomly selected second credit prize symbols; and populating the special symbol position with a special symbol;

randomly selecting a cell of the grid using the random number generator; and removing the plurality of virtual reels from the game screen and animating fifteen individual unisymbol reels to appear on the game screen each individual unisymbol reel being displayed in a corresponding cell of the grid by:

rendering the special unisymbol reel including the special symbol to appear within the randomly selected cell; and rendering the plurality of primary unisymbol reels to appear within each remaining cell with at least one primary unisymbol reel displaying an inactive prize symbol;

animating the plurality of unisymbol reels to simulate spinning with the at least one primary unisymbol reel displaying the inactive prize symbol being held in place;

stopping the plurality of unisymbol reels with the special symbol appearing with the plurality of unisymbol reels in a stopped position;

transforming the inactive prize symbol into an active prize symbol; and animating each of the plurality of unisymbol reels to simulate spinning and stopping to display an outcome of a subsequent reel spin.

2. The gaming machine of claim 1, wherein the one or more processors is programmed to execute the algorithm including the steps of:

rendering each inactive prize symbol with an image of an amount of credits.

3. The gaming machine of claim 1, wherein the one or more processors is programmed to execute the algorithm including the steps of:

rendering the least one primary unisymbol reel including a locked credit prize symbol.

4. The gaming machine of claim 1, wherein the one or more processors is programmed to execute the algorithm including the steps of:

rendering the special unisymbol reel including bonus credit prize symbols and the special symbol.

5. The gaming machine of claim 1, wherein the one or more processors is programmed to execute the algorithm including the steps of:

animating an extended spin of the special unisymbol reel during the bonus feature event.

6. A method of operating a gaming machine for displaying a computer-animated reel game, the gaming machine including a cabinet, a display device mounted to the cabinet and including a graphical user interface (GUI) display screen displaying computer-generated images thereon, and a control unit including a random number generator, a memory device storing bonus feature prize symbol weight tables including computer-executable instructions defining a primary unisymbol reel weight table including a plurality of first credit prize symbols having corresponding selection weights and a special unisymbol reel weight table including a plurality of second credit prize symbols having corresponding selection weights, credit prize symbol image data files including computer-executable instructions for generating computer images of game symbols populating symbol positions, and a unisymbol reel strip data file including computer-executable instructions defining a primary unisymbol reel strip and a special unisymbol reel strip, the primary unisymbol reel strip and the special unisymbol reel strip each include a plurality of sequential symbol position logic cells that includes indicators for rendering unisymbol reels with a plurality of symbols, each sequential symbol position logic cell is associated with a symbol position configured to be populated by credit prize symbols that are selected from the credit prize symbol image data files using the bonus feature prize symbol weight tables, the plurality of sequential symbol position logic cells include a plurality of active prize symbol positions configured to be populated with active prize symbols and a plurality of inactive prize symbol positions configured to be populated with inactive prize symbols, and one or more processors operably coupled to the display device, the method including the one or more processors performing an algorithm to display an animated sequence of computer-generated images of the computer-animated reel game on the display device GUI including the steps of:

rendering a game screen on the display device GUI including a grid having a plurality of cells arranged in a plurality of rows and columns having a 3×5 cell arrangement;

animating a plurality of virtual reels to appear in the grid with each virtual reel being displayed in a corresponding column, each of the plurality of virtual reels including a plurality of credit prize symbols;

spinning and stopping each of the plurality of virtual reels to display an outcome of the computer-animated reel game; and replacing the plurality of virtual reels with a plurality of unisymbol reels by:

accessing the unisymbol reel strip data file stored in the memory device and generating the primary unisymbol reel strip including a plurality of first symbol positions and the special unisymbol reel strip including a plurality of second symbol positions and a special symbol position, the special unisymbol reel strip including fewer symbol positions than the primary unisymbol reel strip;

generating a plurality of primary unisymbol reels using the primary unisymbol reel strip by:

accessing the primary unisymbol reel weight table stored in the memory device and randomly selecting first credit prize symbols from the primary unisymbol reel weight table using the random number generator; and populating the plurality of first symbol positions with the randomly selected credit prize symbols;

generating a special unisymbol reel using the special unisymbol reel strip by:

accessing the special unisymbol reel weight table stored in the memory device and randomly selecting second credit prize symbols from the special unisymbol reel weight tables using the random number generator;

populating the plurality of second symbol positions with the randomly selected second credit prize symbols; and populating the special symbol position with a special symbol;

randomly selecting a cell of the grid using the random number generator; and removing the plurality of virtual reels from the game screen and animating fifteen individual unisymbol reels to appear on the game screen each individual unisymbol reel being displayed in a corresponding cell of the grid by:

rendering the special unisymbol reel including the special symbol to appear within the randomly selected cell; and rendering the plurality of primary unisymbol reels to appear within each remaining cell with at least one primary unisymbol reel displaying an inactive prize symbol;

animating the plurality of unisymbol reels to simulate spinning with the at least one primary unisymbol reel displaying the inactive prize symbol being held in place;

stopping the plurality of unisymbol reels with the special symbol appearing with the plurality of unisymbol reels in a stopped position;

transforming the inactive prize symbol into an active prize symbol; and animating each of the plurality of unisymbol reels to simulate spinning and stopping to display an outcome of a subsequent reel spin.

7. The method of claim 6, including the one or more processors performing the algorithm including the steps of:

rendering each inactive prize symbol with an image of an amount of credits.

8. The method of claim 6, including the one or more processors performing the algorithm including the steps of:

rendering the least one primary unisymbol reel including a locked credit prize symbol.

9. The method of claim 6, including the one or more processors performing the algorithm including the steps of:

rendering the special unisymbol reel including bonus credit prize symbols and the special symbol.

10. The method of claim 6, including the one or more processors performing the algorithm including the steps of:

animating an extended spin of the special unisymbol reel during the bonus feature event.

11. A non-transitory computer-readable storage media having computer-executable instructions embodied thereon to operate a gaming machine for displaying a computer-animated reel game, the gaming machine including a cabinet, a display device mounted to the cabinet and including a graphical user interface (GUI) display screen displaying computer-generated images thereon, and a control unit including a random number generator, a memory device storing bonus feature prize symbol weight tables including computer-executable instructions defining a primary unisymbol reel weight table including a plurality of first credit prize symbols having corresponding selection weights and a special unisymbol reel weight table including a plurality of second credit prize symbols having corresponding selection weights, credit prize symbol image data files including computer-executable instructions for generating computer images of game symbols populating symbol positions, and a unisymbol reel strip data file including computer-executable instructions defining a primary unisymbol reel strip and a special unisymbol reel strip, the primary unisymbol reel strip and the special unisymbol reel strip each include a plurality of sequential symbol position logic cells that includes indicators for rendering unisymbol reels with a plurality of symbols, each sequential symbol position logic cell is associated with a symbol position configured to be populated by credit prize symbols that are selected from the credit prize symbol image data files using the bonus feature prize symbol weight tables, the plurality of sequential symbol position logic cells include a plurality of active prize symbol positions configured to be populated with active prize symbols and a plurality of inactive prize symbol positions configured to be populated with inactive prize symbols, and one or more processors operably coupled to the display device, when executed by the one or more processors the computer-executable instructions cause the one or more processors to perform an algorithm to display an animated sequence of computer-generated images of the computer-animated reel game on the display device GUI including the steps of:

rendering a game screen on the display device GUI including a grid having a plurality of cells arranged in a plurality of rows and columns having a 3×5 cell arrangement;

animating a plurality of virtual reels to appear in the grid with each virtual reel being displayed in a corresponding column, each of the plurality of virtual reels including a plurality of credit prize symbols;

spinning and stopping each of the plurality of virtual reels to display an outcome of the computer-animated reel game; and replacing the plurality of virtual reels with a plurality of unisymbol reels by:

accessing the unisymbol reel strip data file stored in the memory device and generating the primary unisymbol reel strip including a plurality of first symbol positions and the special unisymbol reel strip including a plurality of second symbol positions and a special symbol position, the special unisymbol reel strip including fewer symbol positions than the primary unisymbol reel strip;

generating a plurality of primary unisymbol reels using the primary unisymbol reel strip by:

accessing the primary unisymbol reel weight table stored in the memory device and randomly selecting first credit prize symbols from the primary unisymbol reel weight table using the random number generator; and populating the plurality of first symbol positions with the randomly selected credit prize symbols;

generating a special unisymbol reel using the special unisymbol reel strip by:

accessing the special unisymbol reel weight table stored in the memory device and randomly selecting second credit prize symbols from the special unisymbol reel weight tables using the random number generator;

populating the plurality of second symbol positions with the randomly selected second credit prize symbols; and populating the special symbol position with a special symbol;

randomly selecting a cell of the grid using the random number generator; and removing the plurality of virtual reels from the game screen and animating fifteen individual unisymbol reels to appear on the game screen each individual unisymbol reel being displayed in a corresponding cell of the grid by:

rendering the special unisymbol reel including the special symbol to appear within the randomly selected cell; and rendering the plurality of primary unisymbol reels to appear within each remaining cell with at least one primary unisymbol reel displaying an inactive prize symbol;

animating the plurality of unisymbol reels to simulate spinning with the at least one primary unisymbol reel displaying the inactive prize symbol being held in place;

stopping the plurality of unisymbol reels with the special symbol appearing with the plurality of unisymbol reels in a stopped position;

transforming the inactive prize symbol into an active prize symbol; and animating each of the plurality of unisymbol reels to simulate spinning and stopping to display an outcome of a subsequent reel spin.

12. The non-transitory computer-readable storage media of claim 11, wherein the computer-executable instructions cause the one or more processors to perform the algorithm including the steps of:

rendering each inactive prize symbol with an image of an amount of credits.

13. The non-transitory computer-readable storage media of claim 11, wherein the computer-executable instructions cause the one or more processors to perform the algorithm including the steps of:

rendering the least one primary unisymbol reel including a locked credit prize symbol.

14. The non-transitory computer-readable storage media of claim 11, wherein the computer-executable instructions cause the one or more processors to perform the algorithm including the steps of:

rendering the special unisymbol reel including bonus credit prize symbols and the special symbol.

* * * * *